United States Patent [19]

Kido

[11] Patent Number: 5,493,551
[45] Date of Patent: Feb. 20, 1996

[54] DISK LOADING/UNLOADING APPARATUS FOR COMPACT DISKS OF DIFFERENT DIAMETERS

[75] Inventor: Kunio Kido, Tokyo, Japan

[73] Assignee: Tanashin Denki Co., Ltd., Japan

[21] Appl. No.: 278,072

[22] Filed: Jul. 20, 1994

[30] Foreign Application Priority Data

Jul. 26, 1993 [JP] Japan .................................. 5-202529
Dec. 3, 1993 [JP] Japan .................................. 5-339010

[51] Int. Cl.$^6$ .................................................. G11B 33/02
[52] U.S. Cl. .................................................. 369/77.1
[58] Field of Search ....................................... 369/77.1

[56] References Cited

U.S. PATENT DOCUMENTS

| | | | |
|---|---|---|---|
| 4,625,304 | 11/1986 | Kanamaru et al. | 369/77.1 |
| 4,733,387 | 3/1988 | Yoshimura | 369/77.1 |
| 5,097,460 | 3/1992 | Camps et al. | 369/77.1 |
| 5,173,893 | 12/1992 | Morikawa et al. | 369/77.1 |
| 5,173,894 | 12/1992 | Kido | 369/77.1 |
| 5,195,077 | 3/1993 | Ishikawa et al. | 369/75.2 |

FOREIGN PATENT DOCUMENTS 0296829 12/1988 European Pat. Off. .
4195855 7/1992 Japan .

*Primary Examiner*—John H. Wolff
*Assistant Examiner*—Adriana Giordana
*Attorney, Agent, or Firm*—Evenson, McKeown, Edwards & Lenahan

[57] ABSTRACT

A disk playback apparatus comprises a loader holder, a loader movably disposed in the loader holder and having a disk slot, a pair of front levers symmetrically mounted on the front portion of the loader, and a pair of rear levers symmetrically mounted on the rear portion of the loader. When a compact disk is inserted into the loader through the disk slot so that a insert distance set in accordance with the diameter of the disk is exceeded, the front and rear levers cooperate with one another to push the loader into the loader holder while holding the inserted disk.

10 Claims, 26 Drawing Sheets

5,493,551

DISK LOADING/UNLOADING APPARATUS FOR COMPACT DISKS OF DIFFERENT DIAMETERS

BACKGROUND OF THE INVENTION

1. Field of the Invention

The present invention relates to a playback apparatus for reproducing a disk for use as a recording medium, and more particularly to a playback apparatus capable of loading disks of a plurality of types having different diameters.

2. Description of the Related Art

Recently, there has been a remarkable spread of disk playback apparatuses for optically reproducing information recorded in the form of tracks of pits on a disk. Disks to be reproduced by means of the disk playback apparatuses include laser disks (LDs) of 30-cm diameter, compact disks (CDs) of 12- or 18-cm diameter, etc. Accordingly, the disk playback apparatuses of this type are expected to be able to reproduce disks with different diameters.

Disclosed in Jpn. Pat. Appln. KOKAI Publication No. 4-195855, for example, is a disk playback apparatus of the so-called front-loading type which can deal with CDs with different diameters. This conventional apparatus is provided with a disk loading mechanism which comprises rollers and levers, and then has a complicated construction.

Moreover, the disk loading mechanism cannot operate before a disk is inserted for a predetermined distance in a chassis of the playback apparatus. If the disk insertion distance is adjusted substantially to the radius of a disk of 12-cm diameter, therefore, the greater part of an 8-cm disk must be inserted into the chassis in order to actuate the disk loading mechanism. Thus, the 8-cm disk cannot be easily handled during its loading operation.

In ejecting the loaded disk, on the other hand, the disk loading mechanism allows the disk to project from the chassis only for a distance equal to the difference between the insertion distance and the disk diameter. In the case of the 8-cm disk, therefore, the disk ejection distance is so short that the disk cannot be taken out with ease.

If the insertion distance is adjusted to the disk of 8-cm diameter, however, the 12-cm disk cannot be steadily supported by means of the disk loading mechanism when it is loaded. When the 12-cm disk is ejected, moreover, the greater part of its body projects from the chassis, so that it may possibly jump out.

SUMMARY OF THE INVENTION

The object of the present invention is to provide a disk playback apparatus in which disks of different diameters can be loaded by means of a simple structure, and the disks can be handled with ease when they are loaded and ejected.

The above object is achieved by a disk playback apparatus according to the present invention, which comprises: a loader holder having an axis; a loader supported for movement along the axis in the loader holder and having a disk insertion plane containing the axis such that a disk is allowed to be inserted into the loader along the disk insertion plane; detecting means for detecting an outside diameter of the disk inserted in the loader, the detecting means including a moving member adapted to be pressed by the outer peripheral edge of the disk and move in a direction intersecting the direction of insertion of the disk within the disk insertion plane as the disk is inserted into the loader; and push means for pushing the loader into the loader holder along the disk insertion direction while holding the disk when the disk is inserted so that the distance of movement of the moving member exceeds a discriminated distance adapted to the diameter of the disk, the push means including a conversion member for converting the disk inserting operation into loader pushing operation and changing means for changing the timing for the loader pushing operation of the conversion member in accordance with the distance of movement of the moving member, the inserted disk being in a state corresponding to a state such that the disk is ejected from the loader when the distance of movement is equal to the discriminated distance.

According to the playback apparatus described above, discriminated distances for large and small disks are settled independently of each other. When a disk is inserted into the loader to a distance exceeding the discriminated distance for the disk, therefore, the loader, along with the disk therein, is pushed into the loader holder by the agency of the push means. This action of the loader can be utilized for settling the operation timing for the disk loading mechanism.

Thus, when the small disk is used, the disk loading mechanism can be started with the disk inserted for a relatively short distance in the loader. With use of the large disk, on the other hand, the loading mechanism can be started when the disk insertion distance in the loader is longer than that for the small disk.

When the disk loading mechanism is started, the disk is in the state corresponding to the state established when it is ejected from the loader, so that it can be easily drawn out of the loader.

More specifically, the moving member of the detecting means includes a front lever rotatably mounted on the loader and extending in the disk insertion direction, the front lever having a distal end movable within the disk insertion plane while being pressed by the outer peripheral edge of the disk as the disk is inserted. The conversion member of the push means includes a rear lever rotatably mounted on the loader, the rear lever being situated on the back side of the loader as compared with the front lever with respect to the disk insertion direction, and having one end movable within the disk insertion plane while being pressed by the outer peripheral edge of the inserted disk and the other end capable of engaging the loader holder. Moreover, the changing means of the push means includes shift means for shifting a rotational region for the rear lever within a plane along the disk insertion plane, in accordance with the rotational angle of the front lever, and a plurality of stops provided corresponding to the respective diameters of disks to be inserted into the loader holder and adapted to prevent the other end of the rear lever from moving.

In this case, the stop corresponding to the inserted disk catches the other end of the rear lever and causes the rear lever to turn around the other end thereof, thereby pushing in the loader toward a loading position with respect to the loader holder, when the disk is inserted beyond the position for the ejected state in a manner such that the outer peripheral edge of the disk presses the one end of the rear lever to rotate the rear lever.

Preferably, the distal end of the front lever and the one end of the rear lever each have a hook adapted to hold the outer peripheral edge of the inserted disk when engaged therewith. The center of the disk is situated inside exceeding the hook of the front lever when the disk is inserted deeper than in the ejected state.

As the loader, along with the front lever, is pushed into the loader holder, therefore, the hook of the front lever can draw the inserted disk into the loader holder.

The shift means includes an arcuate slit formed in the rear end portion of the front lever, a shaft on the rear lever, slidable in the slit and defining the center of rotation of the rear lever, and an aperture formed in the loader holder and allowing the shaft to shift in a direction intersecting the disk insertion direction.

When the front lever is rotated extensively as the large disk is inserted into the loader, in this case, the inner wall of the slit of the front lever presses the shaft of the rear lever. Thereupon, the shaft moves in the aperture of the loader holder, so that the whole rear lever is shifted.

Preferably, the detecting means is another front lever paired with the first front lever, the pair of front levers being arranged on the loader so as to be symmetrical with respect to the disk insertion direction, and further includes first urging means for urging the pair of front levers to rotate in a direction such that the respective distal ends of the front levers approach each other. The push means is another rear lever paired with the first rear lever, the pair of rear levers being arranged on the loader so as to be symmetrical with respect to the disk insertion direction, and further includes second urging means for urging the pair of rear levers to rotate in a direction such that the one end of each rear lever is directed opposite to the disk insertion direction. In this case, the pair of front levers and the pair of rear levers serve to position the center of the inserted disk with respect to the loader when their respective hooks hold the disk. Thus, the pairs of front and rear levers have a disk centering function as well as the disk holding function.

If the second urging means is formed of springs, the respective restoring forces of the springs cause the rear levers corresponding thereto to turn in opposite directions around the corresponding stops of the loader holder when the loader is returned from the loading position so that the respective other ends of the rear levers abut individually against the stops. The respective turns of the rear levers can cause the inserted disk to be pushed out securely from the loader into the ejected state.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

Outline of Disk Playback Apparatus

Figure 1:
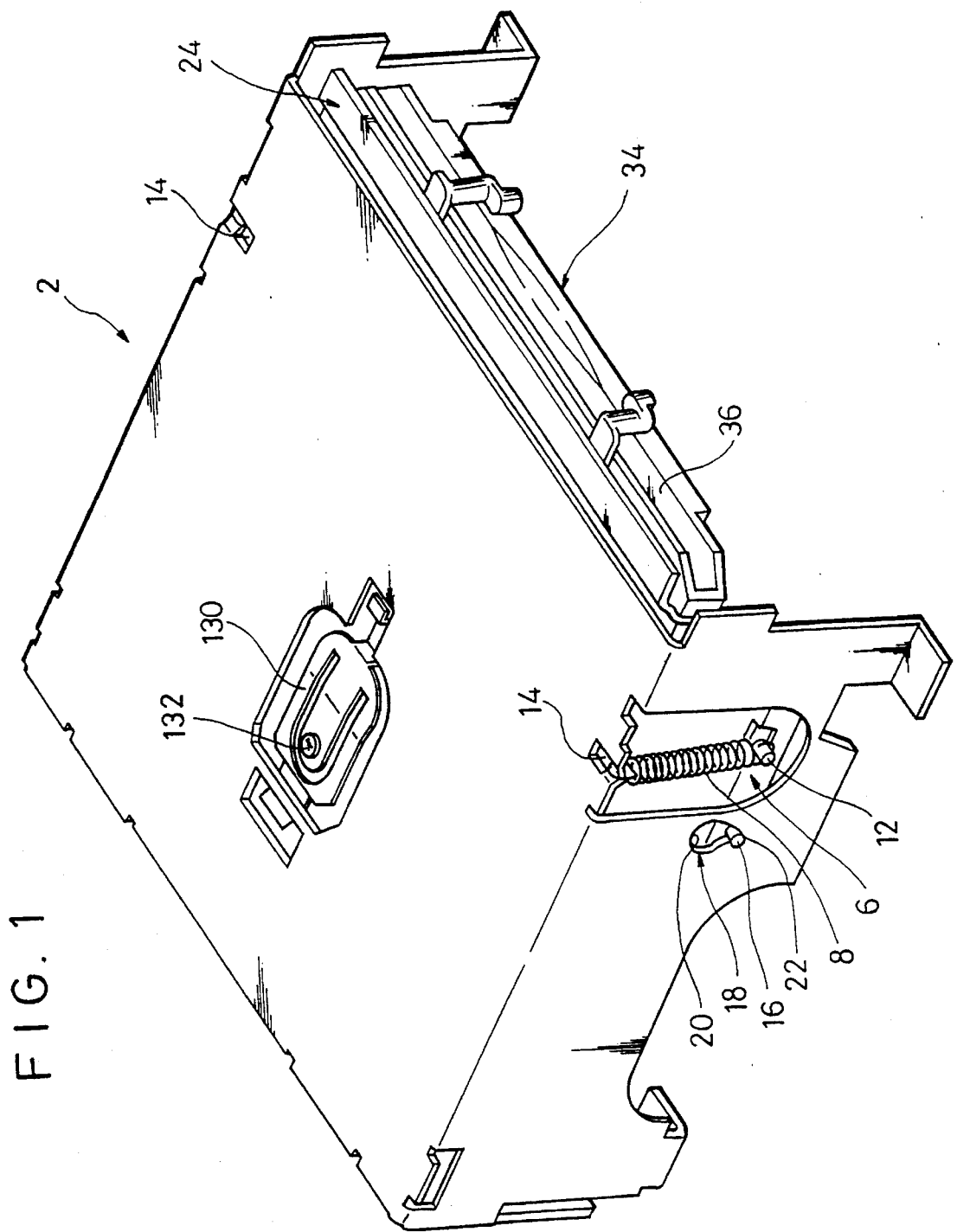
FIG. 1 is a schematic perspective view of a disk playback apparatus.
Figure 2:
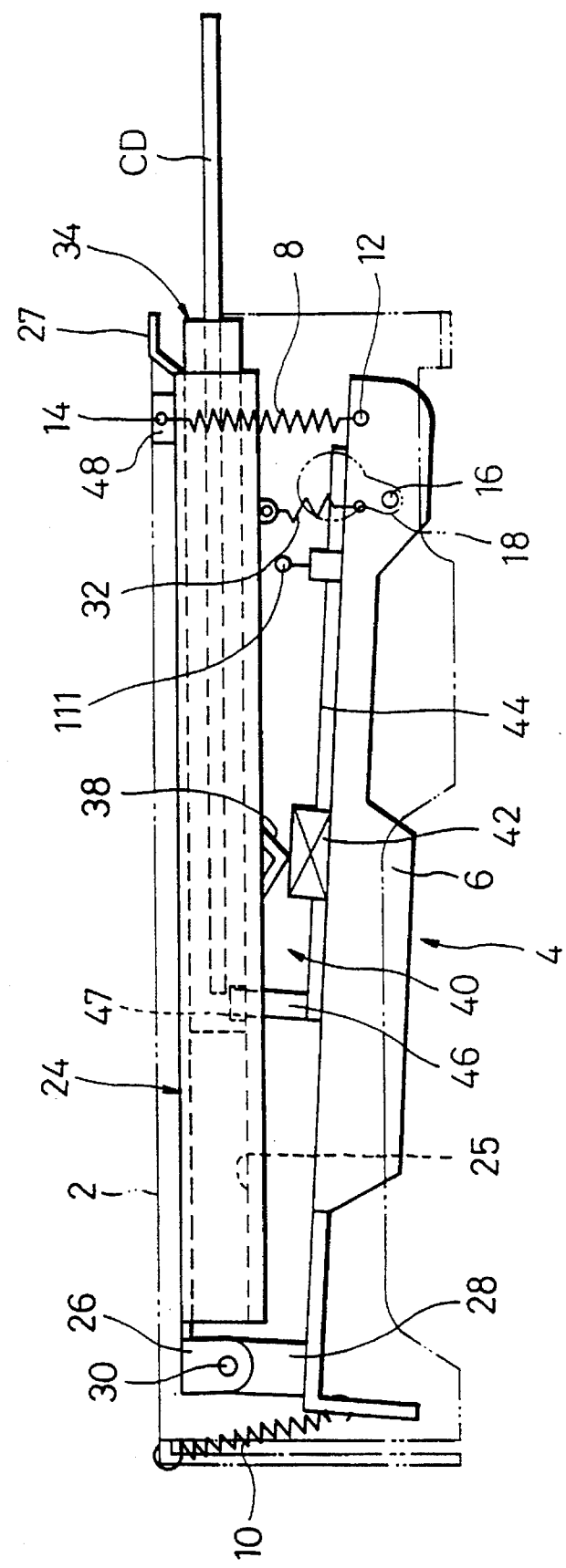
FIG. 2 is a schematic side view showing the interior of the playback apparatus of FIG. 1 with a CD in its ejected state.

As shown in FIGS. 1 and 2, a disk playback apparatus comprises a main chassis 2, which is in the form of a box having open front and bottom faces. A reproducing unit 4 is contained in the chassis 2. The reproducing unit 4 has a rectangular unit chassis 6, and a turntable and an optical pickup are arranged on the upper surface of the chassis 6. The turntable and the pickup are not shown in FIG. 1.

The reproducing unit 4 is suspended from the main chassis 2 by means of a suspension, which includes a pair of front springs 8 and a pair of rear springs 10. The springs 8 and 10, which are formed of a tension coil spring each, connect the unit chassis 6 and the main chassis 2. More specifically, the unit chassis 6 has a pair of side walls, and a pair of pins 12 protrude outward from these side walls, individually. The pins 12 are situated individually at the respective front end portions of the side walls. A pair of anchor holes 14 are formed individually in the opposite side edges of an upper wall of the main chassis 2. The holes 14 are situated at the front end portion of the chassis 2. The opposite ends of each front spring 8 are anchored individually to each corresponding anchor hole 14 and pin 12 of the main and unit chassis 2 and 6. As shown in FIG. 1, a pair of side walls of the main chassis 2 are partially cut out, so that the chassis 2 cannot interfere with the front springs 8.

Separate anchor holes are formed individually in the respective rear end faces of the main and unit chassis 2 and 6, and the opposite ends of each rear spring 10 are anchored to the anchor holes of their corresponding chassis 2 and 6.

Moreover, a locking pin 16 protrudes outward from each side wall of the unit chassis 6. The tip end of the pin 16 is situated in its corresponding aperture 18 of the main chassis 2. The aperture 18 is bored through each side wall of the chassis 2. As seen from FIG. 1, each aperture 18 includes a circular hole 20 and an arcuate hole 22 continuous with the lower part of the hole 20. The arcuate hole 22 extends toward the rear end of the main chassis 2.

Inside the main chassis 2, a loader holder 24 is located above the reproducing unit 4. The holder 24 is formed of a rectangular plate, and its opposite side edge portions are bent downward to form a pair of side walls which face each other. The respective lower edges of the side walls are further bent inward. Thus, the opposite side walls of the loader holder 24 constitute guide grooves 25 which face each other. A visor portion 27 protrudes upward from the front end of the holder 24.

A pair of outer brackets 26 protrude downward from the rear end of the loader holder 24, while a pair of inner brackets 28 protrude upward from the rear end of the unit chassis 6. The outer brackets 26 are connected to their corresponding inner brackets 28 by means of a connecting shaft 30. Thus, the loader holder 24 is mounted on the unit chassis 6 for vertical rotating motion.

Further, the respective front end portions of the loader holder 24 and the unit chassis 6 are connected to each other by means of a pair of pull springs 32 which are formed of a tension coil spring each. The springs 32 urge the holder 24 and the chassis 6 to approach each other. The pull springs 32, like the front springs 8, are located individually on the opposite sides of the loader holder 24 and the unit chassis 6.

Located in the loader holder 24 is a loader 34 which is in the form of a flat box. The opposite side portions of the loader 34 are slidably guided by their corresponding guide grooves 25 of the holder 24. A disk slot 36 (see FIG. 1), which is formed in the front face of the loader 34, allows a compact disk (CD) to be inserted into the loader 34. The CD has a diameter of 12 cm or 8 cm.

The upper and lower walls of the loader 34 are formed having an aperture through which a clamper of the CD is to be loaded or apertures for the access of the turntable and the pickup.

A triangular projection 38 protrudes from the lower surface of the loader holder 24. The projection 38 is formed integrally with a groove wall which defines one of the guide grooves 25 of the holder 24.

On the other hand, the reproducing unit 4 is provided with a drive section 40 which serves to reciprocate the loader 34 as well as to raise and lower the unit 4 itself. The drive section 40 includes a lift member 42 adapted to engage the projection 38 and a rack 44 for reciprocating the loader 34. As mentioned later, the lift member 42 can ascend or descend relatively to the unit chassis 6. The rack 44 is slidably located on the upper surface of the chassis 6, and a coupler 46 protrudes upward from the rear end of the rack 44. The coupler 46 is inserted in an engaging hole 47, which is formed in the lower surface of the rear end portion of the loader 34, thereby connecting the rack 44 and the loader 34. Thus, the rack 44 and the loader 34 can reciprocate in one.

The loader holder 24, loader 34, and drive section 40 will be described in detail later.

Let it be supposed that the disk playback apparatus is presently in its unloading state shown in FIG. 2. In this state, the lift member 42 of the drive section 40 is an its up position. Accordingly, the lift member 42 and the projection 38 keep the loader 34 and the reproducing unit 4 wide apart from each other in the vertical direction in a manner such that the pull springs 32 are stretched. Thus, the loader holder 24 is kept horizontal with its front end in contact with a cushioning member 48 on the main chassis 2. On the other hand, the reproducing unit 4 is rotated downward around the connecting shafts 30, and its front end is situated lower than its rear end. In this inclined position of the reproducing unit 4, each locking pin 16 thereof is situated at the terminal end of the arcuate hole 22 of its corresponding aperture 18 of the main chassis 2. In this state, the reproducing unit 4 is prevented from rotating downward, so that the loader holder 24 is immovable with its front end securely pressed against the cushioning member 48 of the main chassis 2.

On the other hand, the loader 34 in the loader holder 24 is situated at the front end of the holder 24 in a manner such that its front end projects slightly from the holder 24.

When the CD is inserted through the disk slot 36 into the loader 34 in the state shown in FIG. 2 to cause the loader 34 to be pushed into the loader holder 24, this forced introduction of the loader 34 is detected by means of a loading switch, such as a photosensor or limit switch. Thereupon, the rack 44 of the drive section 40 is moved toward the rear end of the reproducing unit 4. As this is done, the loader 34, having the CD therein, is moved in the loader holder 24 toward the rear portion thereof.

Figure 3:
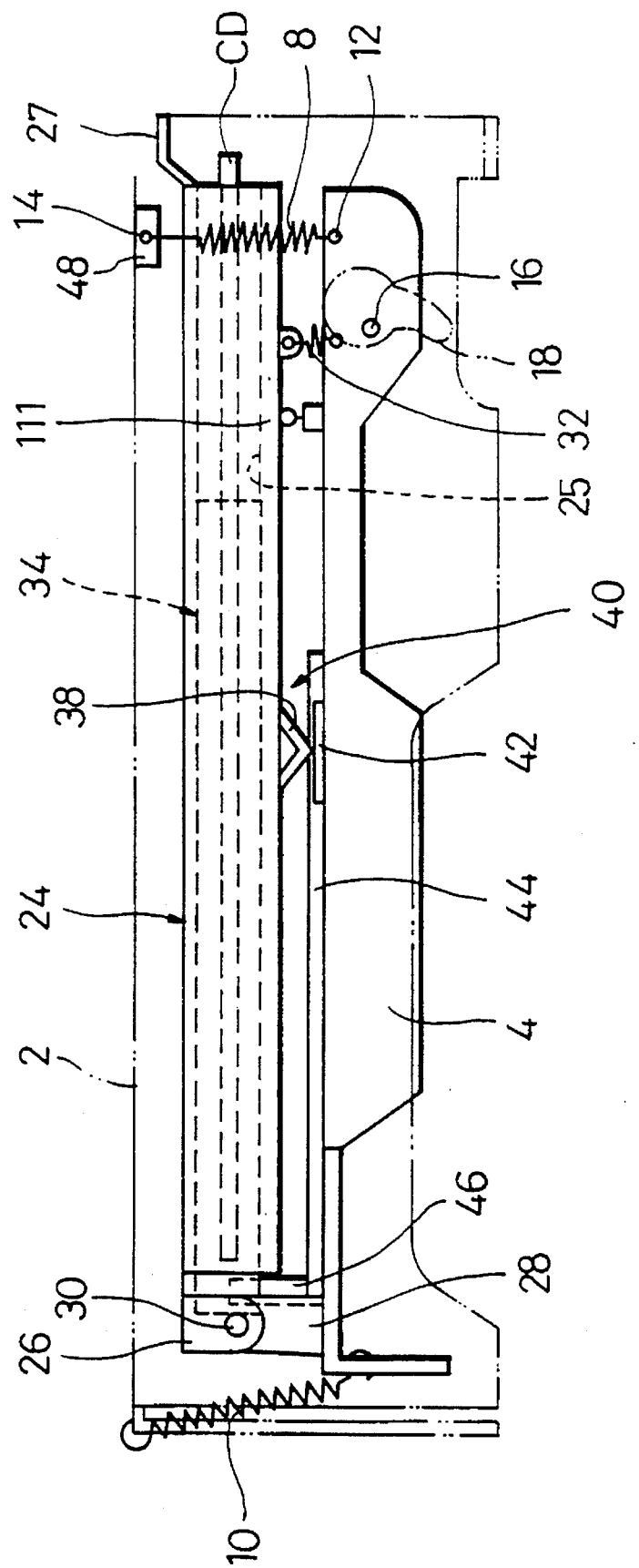
FIG. 3 is a schematic view showing the interior of the playback apparatus of FIG. 1 with the CD loaded.

When the loader 34 reaches the rear portion of the interior of the loader holder 24, that is, a loading position, the lift member 42 of the drive section 40 is lowered to its down position, as shown in FIG. 3, and the loader holder 24 and the reproducing unit 4 are urged to approach each other by means of the urging force of the pull springs 32.

As the loader holder 24 and the reproducing unit 4 approach each other in this manner, the front end of the holder 24 is separated downward from the cushioning member 48 of the main chassis 2. On the other hand, the reproducing unit 4 is rotated upward, so that each locking pin 16 thereof slips out from the arcuate hole 22 of its corresponding aperture 18 into the circular hole 20, to be freed. Accordingly, the reproducing unit 4 and the loader holder 24 are elastically suspended from the main chassis 2 by means of the front and rear springs 8 and 10. As a result, external vibrations are absorbed by the springs 8 and 10, so that only restrained vibrations can be transmitted to the unit 4 and the holder 24.

When the reproducing unit 4 is rotated toward the loader holder 24, its turn table, in conjunction with a clamper of the loader 34, clamps the CD in the loader 34, while the pickup of the unit 4 approaches the record surface of the CD. The CD can be reproduced in this state.

When an ejector button (not shown) of the play back apparatus is pushed after the reproduction of the CD is finished, the lift member 42 of the drive section 40 is raised again. Thereafter, the loader 34, holding the CD therein, is returned to the front portion of the interior of the loader holder 24. Thus, the disk playback apparatus is restored to the unloading state shown in FIG. 2, whereupon the CD is ejected from the loader 34 in the manner mentioned later.

Figure 4:
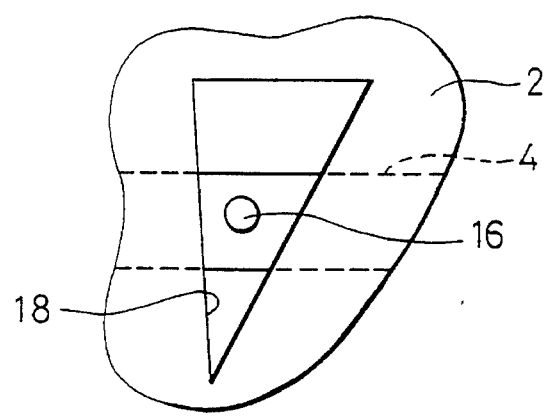
FIG. 4 is a view showing an alternative way of supporting a playback unit on a main chassis.
Figure 5:
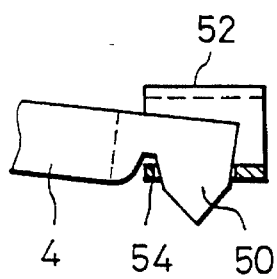
FIG. 5 is a view showing another way of supporting the playback unit, different from the one shown in FIG. 4.

Each aperture 18 of the main chassis 2 may have the shape of an inverted triangle, as shown in FIG. 4. Referring to FIG. 5, there is shown a locking mechanism which can be used in place of the locking pins 16 and the apertures 18. This locking mechanism includes a pair of locking teeth 50 which protrude from the front end of the reproducing unit 4. The lower part of each tooth 50 is triangular in shape. When the reproducing unit 4 is rotated downward, the locking teeth 50 are inserted downward into an aperture 54 in a cross plate 52, thereby preventing the unit 4 from rotating downward. The cross plate 52 extends in the main chassis 2 in the crosswise direction thereof, and its opposite ends are fixed individually to the side walls of the chassis 2.

Figure 6:
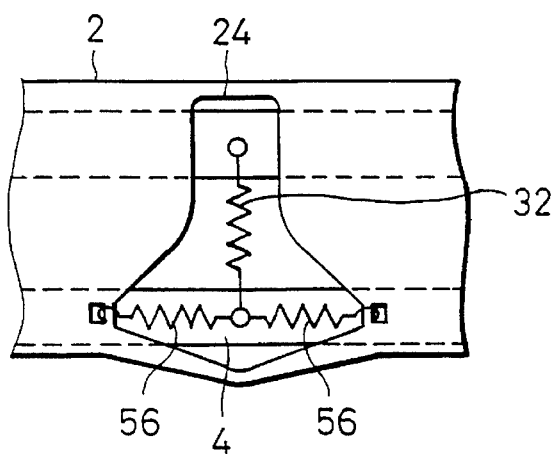
FIG. 6 is a view showing still another way of supporting the playback unit.

Referring to FIG. 6, moreover, the reproducing unit 4 and the side walls of the main chassis 2 are further connected by means of a pair of horizontal springs 56. Each spring 56 is formed of a tension coil spring, and elastically supports the reproducing unit 4 and the loader holder 24 in the horizontal direction. The paired horizontal springs 56 are arranged individually on the opposite sides of the reproducing unit 4.

Drive Section

Figure 7:
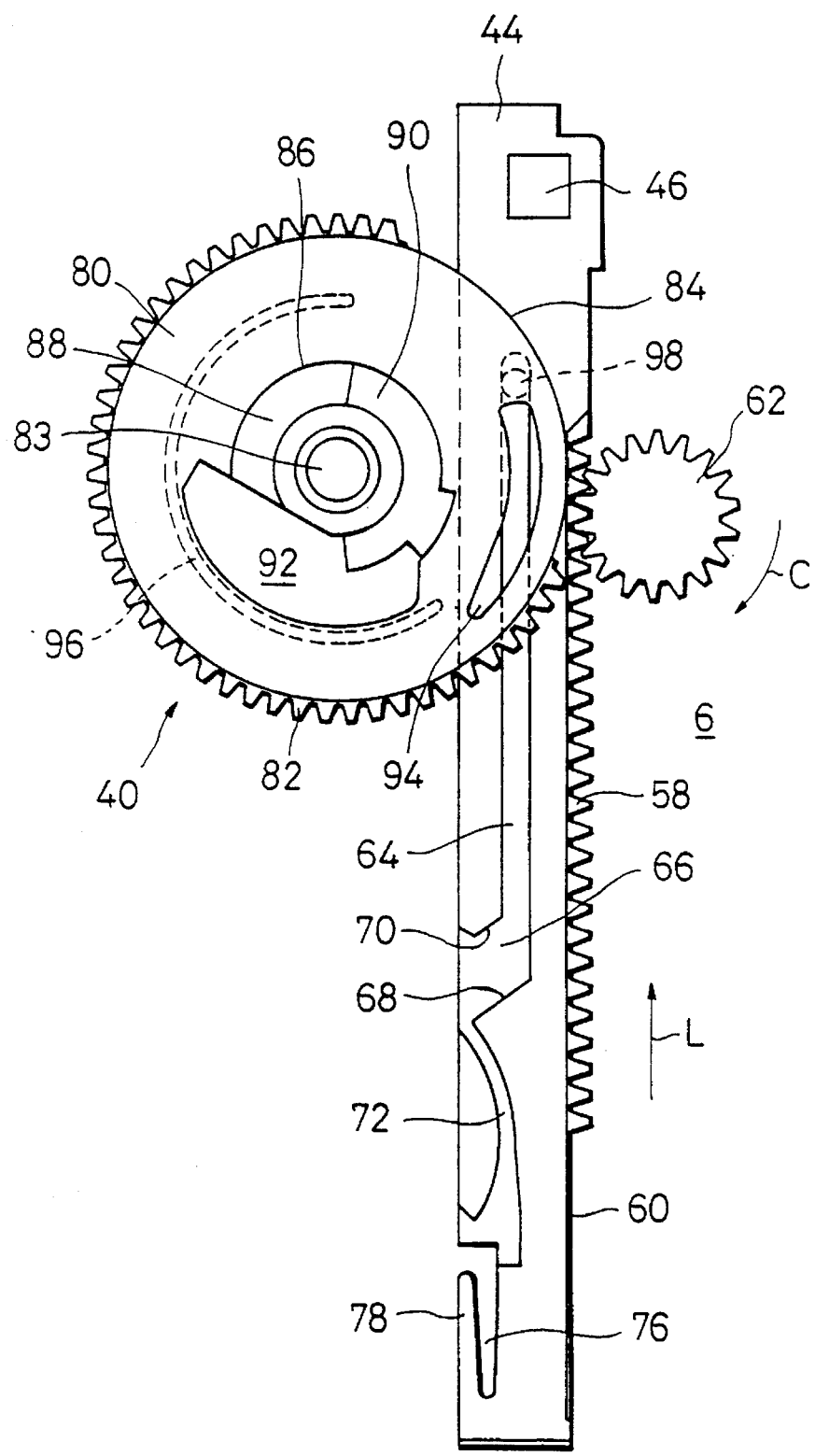
FIG. 7 is a plan view showing a drive section of a loader shown in FIG. 2.

FIG. 7 is a plan view specifically showing the drive section 40. The rack 44 of the section 40 is formed of a synthetic resin, and is located on the upper surface of the reproducing unit 4 or its unit chassis 6. The rack 44 extends in the moving direction of the loader 34. The upper surface of the unit chassis 6 is provided with a plurality of guides (not shown) for guiding the rack 44.

The rack 44 has rack teeth 58 on its right-hand side edge, as shown in FIG. 7. The rack teeth 58 start at a position at a predetermined distance from the rear end of the rack 44, and terminate in a position at a given distance from the front end of the rack 44. Thus, that portion of the right-hand side edge of the rack 44 which is situated between the terminal of the rack teeth 58 and the front end of the rack 44 is defined as a relief surface 60 without the teeth 58. The relief surface 60 is on an extension of the root line of the rack teeth 58.

A pinion 62, which is located on the right of the rack 44, is connected to a reversible motor by means of a power transmission path. Thus, the pinion 62 is rotated forwardly and reversely by means of the motor.

A locking groove 64 is formed in the upper surface of the rack 44. The groove 64 extends in the reciprocating direction of the rack 44 from the starting end side of the rack teeth 58 toward the terminal thereof. That end portion of the locking groove 64 which is situated on the terminal side of the rack teeth 58 is connected to a slant groove 66. The groove 66 declines toward the front end of the rack 44, and opens in the other side edge of the rack 44.

One groove wall of the slant groove 66 which is situated on the front end side of the rack 44 is formed as a first cam face 68, and the other groove wall is a second cam face 70. The outer end of the second cam face 70 is inclined toward the rear end of the rack 44 so that the opening of the groove 66 is spread.

An arcuate groove 72 is formed in the upper surface of the rack 44. The groove 72 is situated nearer to the front end of the rack 44 than the slant groove 66. One end of the arcuate groove 72 opens in the outer end of the first cam face 68, while the other end thereof has an extended width, and opens in the other side edge of the rack 44.

Moreover, a slit 76 is formed in the front end portion of the rack 44 so as to extend in the moving direction of the rack 44. One end of the slit 76 overlaps the other end of the arcuate groove 72, and bends toward and opens in the other side edge of the rack 44. Thus, the slit 76 forms part of the other side edge of the rack 44 as a leaf spring 78.

In the vicinity of the pinion 62, a gear 80 is rotatably mounted on a gear shaft 83 so as to be able to engage the pinion 62. The gear 80 is located above the rack 44 so as to overlap it. The outer peripheral surface of the gear 80 includes a toothed portion 82 and an arcuate surface 84 without teeth.

A lift cam 86 for use as the aforesaid lift member 42 protrudes integrally from the upper surface of the gear 80. The upper surface of the cam 86 is formed as a cam face which extends around the gear shaft 83. This cam face includes a level surface 88 situated at a predetermined height above the upper surface of the gear 80 and a slant surface 90 descending from the level surface 88 toward the upper surface of the gear 80. The lower edge of the slant surface 90 faces an aperture 92 which is formed in the gear 80. The aperture 92 extends in an arc of a circle around the gear shaft 83.

When the projection 38 of the loader holder 24 is held against the cam face of the lift cam 86 from above, the cam 86 urges the projection 38 to raise or lower the holder 24 as the gear 80 rotates. When the projection 38 enters the aperture 92, the reproducing unit 4 and the loader holder 24 come closest to each other, as shown in FIG. 3.

An arcuate slit 94 is formed in the peripheral portion of the gear 80. The slit 94 extends on both sides of one of the boundary between the toothed portion 82 and the arcuate surface 84 of the gear 80. When the end portion of the toothed portion 82 is in mesh with the pinion 62, it is elastically deformed inward in the diametrical direction of the gear 80, whereby the impact between the toothed portion 82 and the pinion 62 is eased.

An arcuate ridge 96 is formed on the lower surface of the gear 80, extending concentrically with the gear shaft 83. The ridge 96 has the same curvature radius as the arcuate groove 72 of the rack 44. Moreover, a pin 98 protrudes from the lower surface of the gear 80. The lower end of the pin 98 can be inserted into the locking groove 64 of the rack 44 from above.

Figure 8:
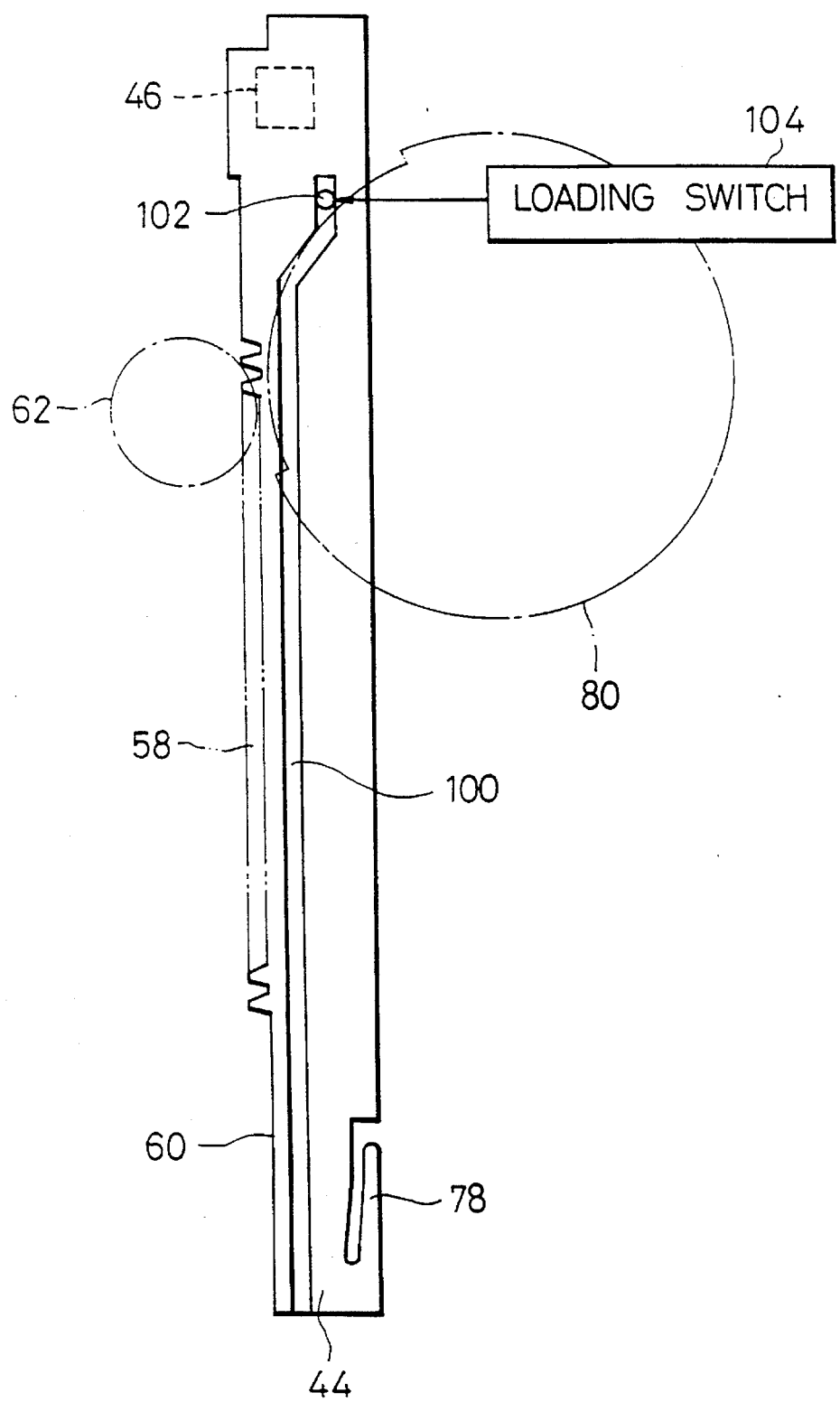
FIG. 8 is a view showing the bottom face of a rack of FIG. 7.

Referring to FIG. 8, there is shown the lower surface of the rack 44, which is formed having a switching groove 100. The groove 100 extends in the moving direction of the rack 44, from the rear end portion of the rack 44 to the front end. The closed end portion of the switching groove 100 obliquely approach the other side edge of the rack 44, and then terminate after extending parallel to the other portion of the groove 100.

The extreme end of a pin 102 is fitted in the switching groove 100. The pin 102 protrudes from the upper surface of the unit chassis 6, and is supported for movement at right angles to the moving direction of the rack 44.

The pin 102 is connected mechanically to the aforesaid loading switch 104. In this case, the switch 104 is formed of a limit switch having a switch rod, which is connected t the pin 102.

Figure 9:
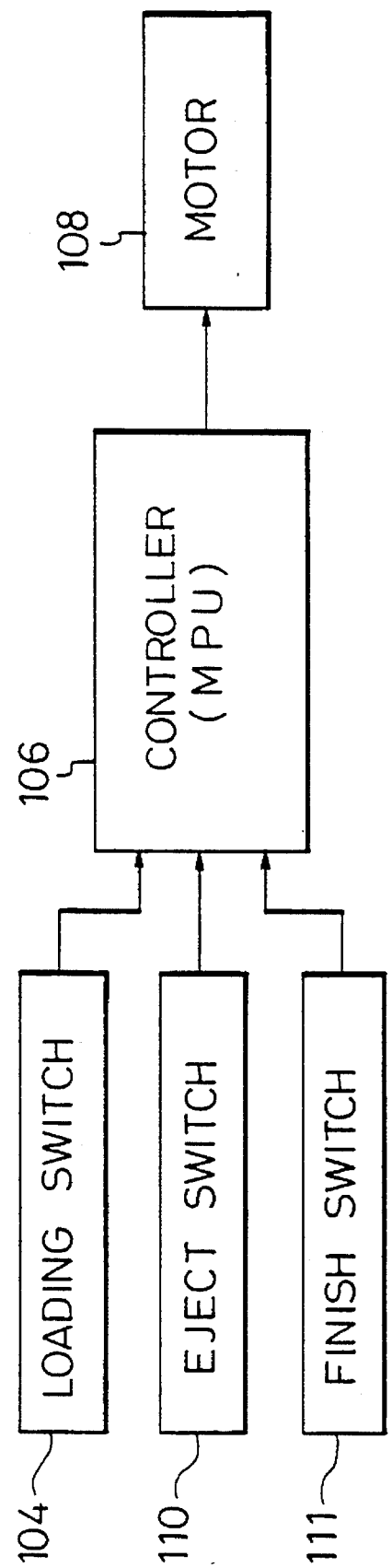
FIG. 9 is a block diagram showing a control circuit of the drive section of FIG. 7.

As shown in FIG. 9, the loading switch 104 is connected electrically to a motor 108 of the pinion 62 through a controller 106, and an eject switch 110 is connected electrically to the controller 106. The switch 110 is operated by means of the aforesaid ejector button. Further, a finish switch is connected electrically to the controller 106. The finish switch is formed of a limit switch and is located on the upper surface of the reproducing unit 4 as shown in FIGS. 2 and 3. When the reproducing unit 4 and the loader holder 24 come closest to each other, as shown in FIG. 3, the finish switch 111 outputs an on-signal to the controller 106. The on-signal from the finish switch 111 indicates the condition that the CD can be reproduced.

Figure 10:
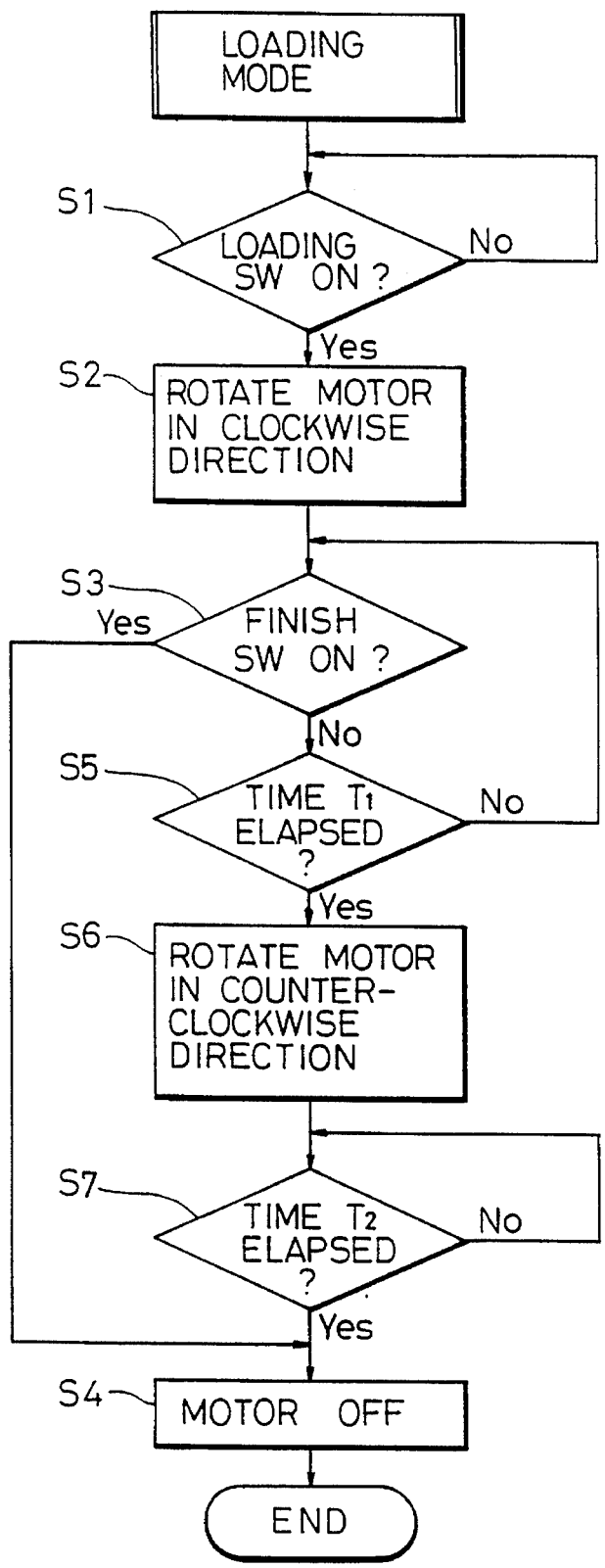
FIG. 10 is a flow chart showing a loading mode executed by the controller of FIG. 7.
Figure 11:
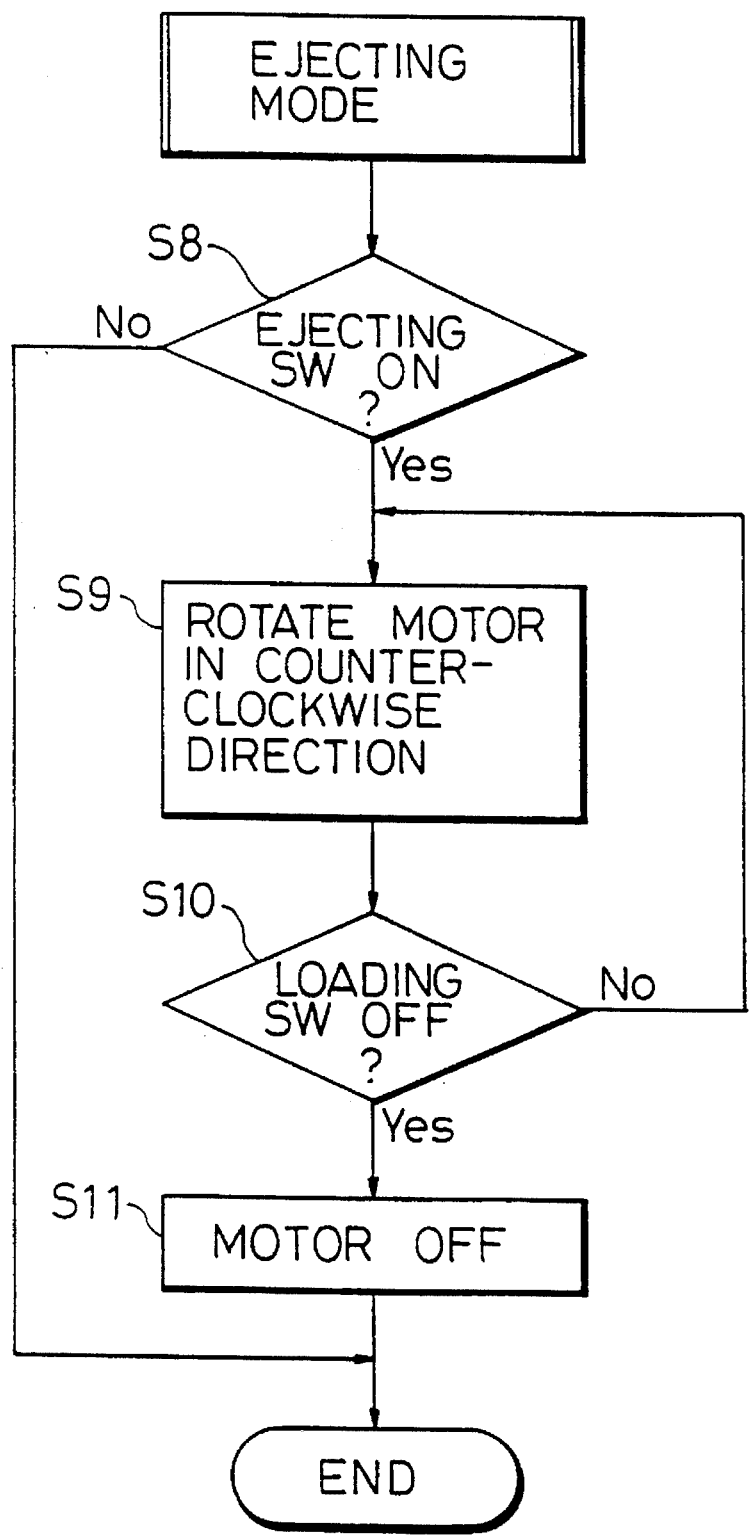
FIG. 11 is a flow chart showing a ejecting mode executed by the controller of FIG.7.

The controller 106 controls the drive of motor 108 according to the loading mode or the ejecting mode which are shown in the flow charts of FIGS. 10 and 11, respectively, as mentioned latter.

Let it be supposed that each part of the drive section 40 is presently in its CD unloading state shown in FIGS. 7 and 8. In this state, the pinion 62 is in engagement with the starting end of the row of the rack teeth 58 of the rack 44 on the rear end side thereof. At this time, the arcuate surface 84 of the gear 80 is opposed to the pinion 62, so that the toothed portion 82 of the gear 80 and the pinion 62 are not in engagement. The pin 98 of the gear 80 is inserted in the one end portion of the locking groove 64 of the rack 44. Moreover, the pin 102 of the loading switch 104 is situated in the closed end of the switching groove 100. On the other hand, the level surface 88 of the lift cam 86 of the gear 80 is in contact with the projection 38 of the loader holder 24, and the holder 24 and the reproducing unit 4 are separated vertically from each other, as shown in FIG. 2.

When the loader 34 is pushed into the loader holder 24 as the CD is inserted in the aforesaid manner, in this state, the rack 44, along with the loader 34, moves in the direction of arrow L of FIG. 7 toward the reproducing unit 4 or the rear end of the unit chassis 6, as the loader 34 and the rack 44 are connected to each other by means of the coupler 46.

When the rack 44 moves, the pin 102 of the loading switch 104 moves relatively in the switching groove 100, and advances to the side slant portion of the groove 100. Thereupon, the pin 102 moves in the crosswise direction of the rack 44, thereby turning the switch 104 on. At this point of time, an on-signal is supplied from the loading switch 104 to the controller 106. On receiving this on-signal, the controller 106 starts the loading mode of FIG. 10. If the decision in Step 1 is YES, the on-signal is supplied from the loading switch 104 to the controller 106. On receiving the on-signal, the controller 106 actuates the motor 108, whereupon the pinion 62 is rotated in the clockwise direction indicated by arrow C in FIG. 7 (Step 2).

As the pinion 62 rotates in this manner, the rack 44, along with the loader 34, further moves in the direction of arrow L. Since the pinion 62 is not in mesh with the toothed portion 82 of the gear 80 in this state, it cannot cause the gear 80 to rotate. As the rack 44 moves, moreover, the pin 98 of the gear 80 moves relatively in the locking groove 64 of the rack 44. Since the rack 44 is prevented from moving in its crosswise direction by the groove 64, however, the gear 80 never rotates.

Immediately before the entire pinion 62 is passed by the rack teeth 58 of the rack 44, the pin 98 of the gear 80 advances relatively from the locking groove 64 to the slant groove 66, and the first cam face 68 of the groove 66 engages the pin 98. Accordingly, the pin 98 moves along the first cam face 68, so that the gear 80 is rotated in the counterclockwise direction, as indicated by arrow CC in FIG. 12. Thereupon, the point of engagement between the rack teeth 58 of the rack 44 and the pinion 62 reaches the terminal of the row of the teeth 58, so that the rotary force of the pinion 62 cannot be transmitted to the rack 44.

As the gear 80 rotates, on the other hand, the toothed portion 82 of the gear 80 engages the pinion 62 at its end portion, and one end of the ridge 96 of the gear 80 gets into the other end portion of the arcuate groove 72 of the rack 44.

Figure 12:
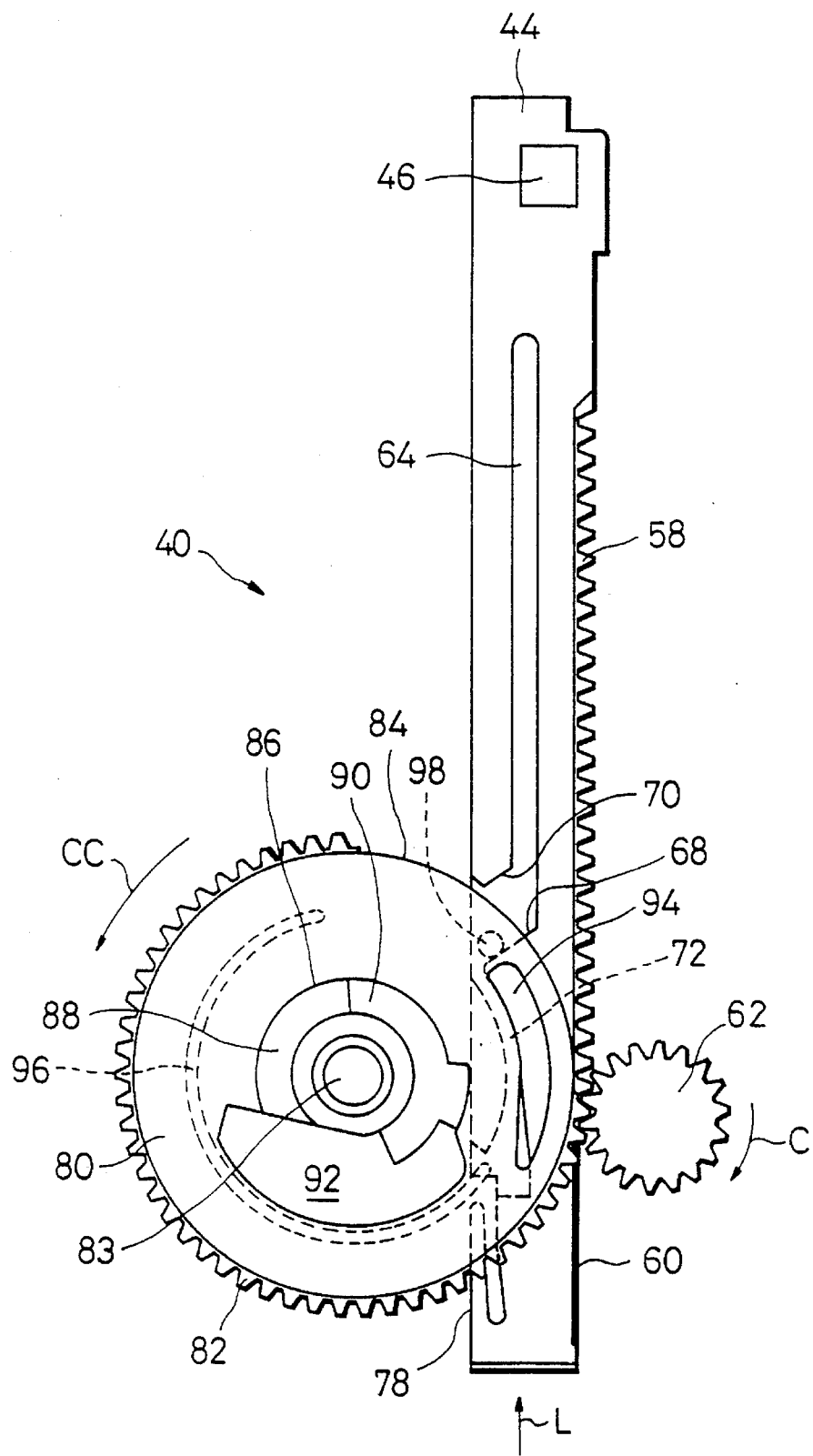
FIG. 12 is a view illustrating the way the rack in the state of FIG. 7 is moved in the CD insertion direction as a motor of the drive section is driven.
Figure 13:
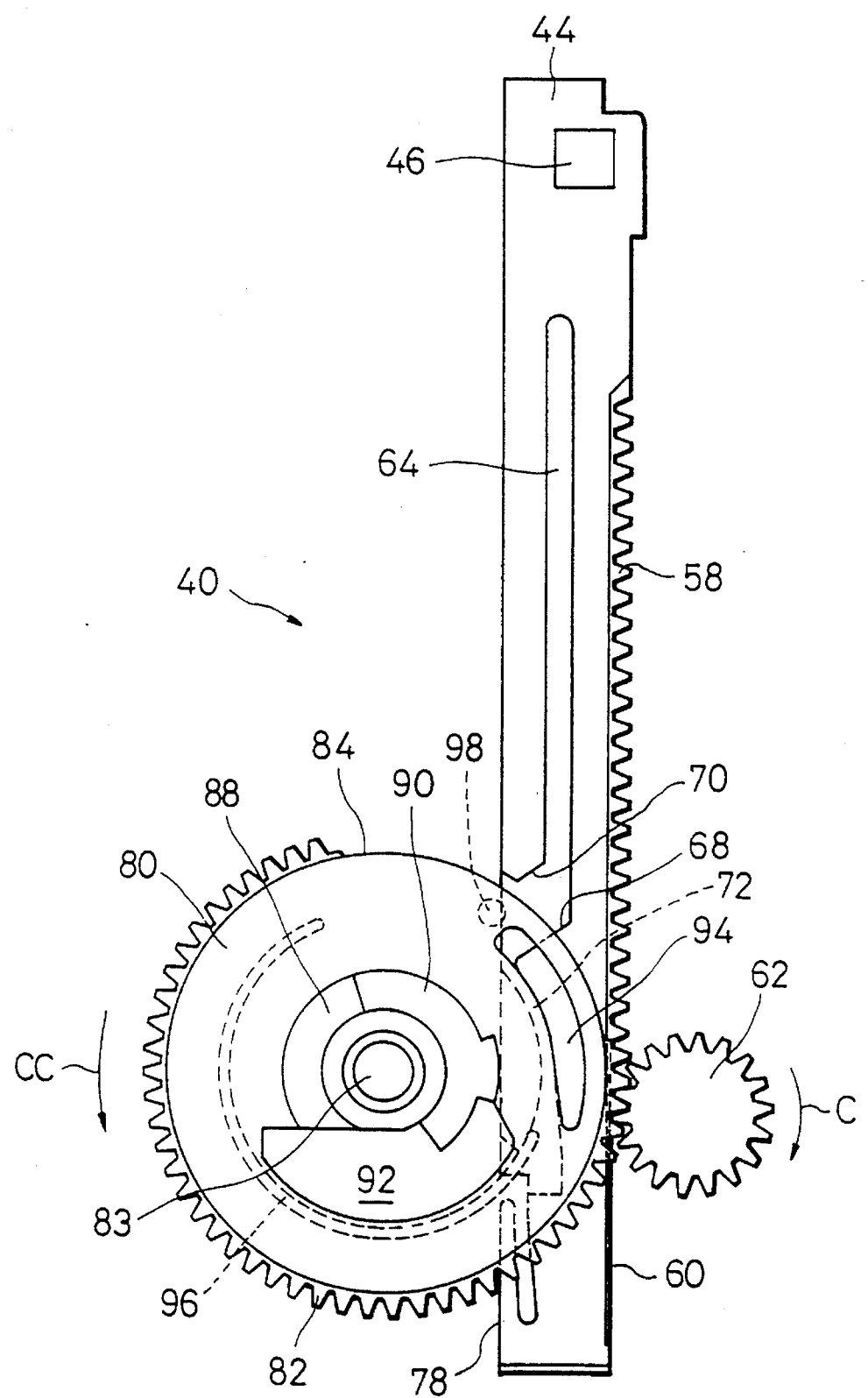
FIG. 13 is a view illustrating the way a gear in the state of FIG. 12 is rotated in the counterclockwise direction.

When the pinion 62 is further rotated in the clockwise direction so that the gear 80 rotates counterclockwise from the state of FIG. 12 to the state of FIG. 13, the pin 98 slips out of the slant groove 66. In the state of FIG. 12, the center of an imaginary circle which contains the arcuate groove 72 as an arc thereof is situated nearer to the front end of the rack 44 than the center of the gear 80. As the gear 80 rotates, therefore, the one end portion of the ridge 96 engages the groove 72, thereby causing the rack 44 to move further in the direction of arrow L. As a result, the center of the imaginary circle coincides with that of the gear 80, the rack teeth 58 of the rack 44 are entirely disengaged from the pinion 62, and the relief surface 60 of the rack 44 faces the pinion 62. In this state, the rotation of the pinion 62 is not transmitted to the rack 44, so that the movement of the rack 44 is stopped, whereupon the rack 44 or the loader 34 is situated in the aforesaid loading position.

When the center of the imaginary circle coincides with that of the gear 80, the ridge 96 further advances in the arcuate groove 72 to be fitted therein as the gear 80 rotates in the counterclockwise direction. Despite the advance in the groove 72, the ridge 96 never pushes the rack 44 further in the direction of arrow L, and yet, prevents the rack 44 from being pushed back.

Figure 14:
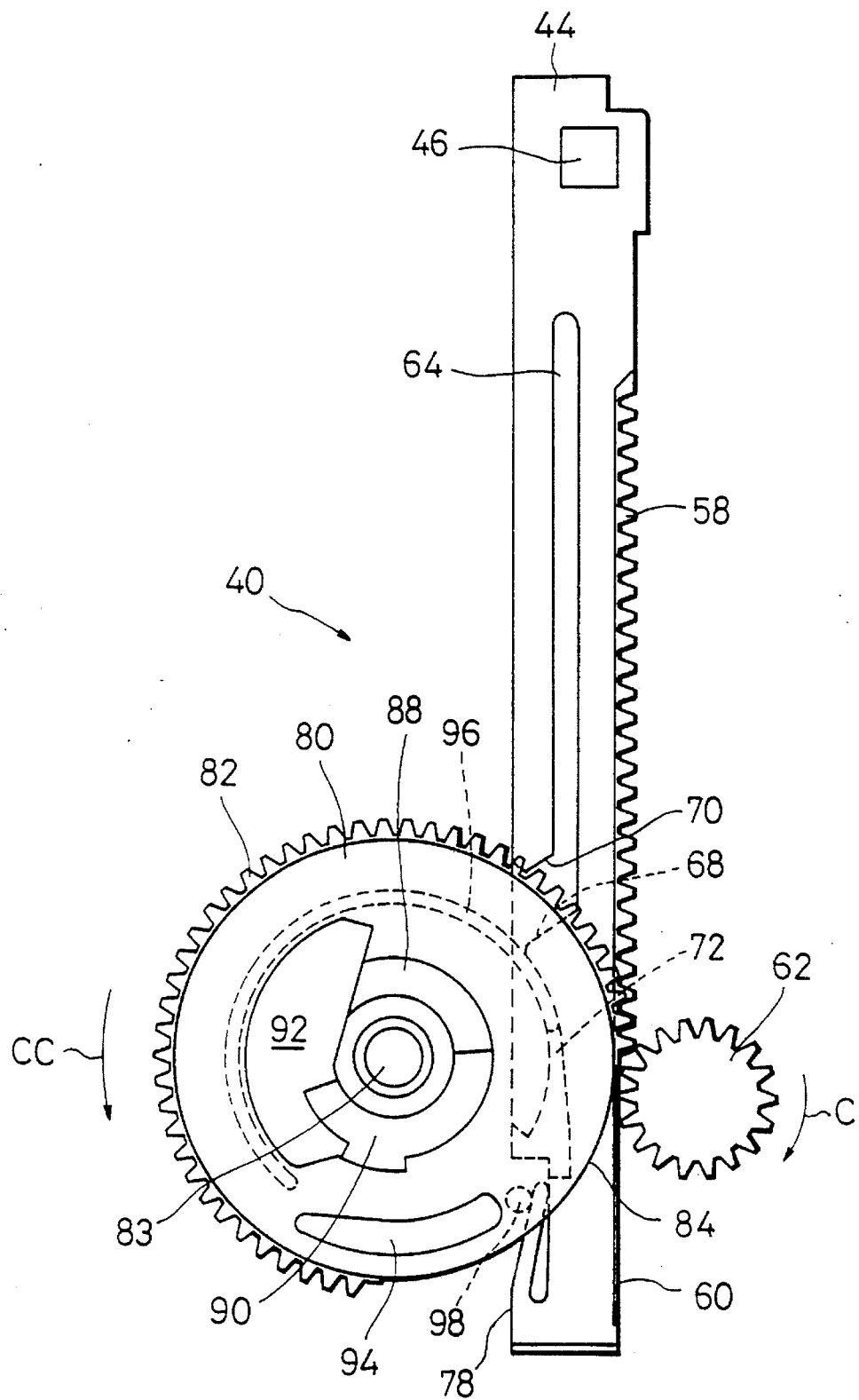
FIG. 14 is a view illustrating the way the gear in the state of FIG. 13 is further rotated in the counterclockwise direction.

When the gear 80 makes an about ¾ turn in the counterclockwise direction from the state of FIG. 13 to the state of FIG. 14, the lift cam 86 of the gear is also rotated. As the cam 86 rotates in this manner, the projection 38 of the loader holder 24 moves relatively on the cam face of the cam 86. More specifically, the projection 38 on the level surface 88 of the cam 86 moves past the slant surface 90 and falls into the aperture 92 of the gear 80, so that the reproducing unit 4 and the holder 24 approach each other, as shown in FIG. 3. In consequence, the CD in the loader 24 is clamped in the aforesaid manner and the on-signal is supplied from the finish switch 111 to the controller 106. At this time, the decision in Step 3 is YES, then the controller 106 stops the drive of the motor 108 (Step 4).

When the gear 80 is rotated to the state of FIG. 14, the pin 98 of the gear 80 abuts against the leaf spring 78 of the rack 44. At this time, the drive of the motor 108 by means of the controller 106 has stopped, a rotor (not shown) of the motor 108 rotates by its own force of inertia, so that the gear 80 goes on rotating in the counterclockwise direction. As shown in FIG. 14, therefore, the pin 98 of the gear 80 causes the leaf spring 78 of the rack 44 to be elastically deformed, while the pinion 62 is cleared by the toothed portion 82 of the gear 80, so that the engagement between the toothed portion 82 and the pinion 62 is removed. Thus, the counterclockwise rotation of the gear 80 is stopped. When this is done, the spring 78 pushes back the pin 98 of the gear 80 by its restoring force, whereupon the gear 80 stops after slightly rotating in the clockwise direction. As the gear 80 rotates in this manner, the toothed portion 82 of the gear 80 engages the pinion 62 at the other end portion thereof, and the gear 80 and the pinion 62 stand ready for the ejection of the CD.

In the loading mode of FIG. 10, if the decision in Step 2 is NO, that is, if the on-signal is not output from the finish switch 111 to the controller 116, the controller 106 discriminates whether a time T1 from the starting of drive of the motor 108 is elapsed or not in Step 5. If the decision in this step is NO, the controller 116 repeatedly executes Step 3.

Here, the time T1 is longer by a predetermined time than the loading period required to obtain the state that the reproducing unit 4 and the loader holder 24 approach each other, that is, the CD can be reproduced after the rotation of the motor 108 starts.

Thus, if the decision in Step 5 is YES, the controller 106 decides that the failure to load the CD occurs and rotates the motor 108 in the counterclockwise direction (FIG. 6). The rotation of the motor 108 in the counterclockwise direction is continued for a time T2 (Step 7). The time T2 is longer by a predetermined time than the unloading time required to return the loader 24 to the unloading position thereof. Thus, in the loading mode of FIG. 10, the failure to load the CD occurs, the loader 24, holding the CD therein, is automatically returned to the unloading position.

After the loading of the CD is normally completed, therefore, the reproduction of the CD starts.

Figure 15:
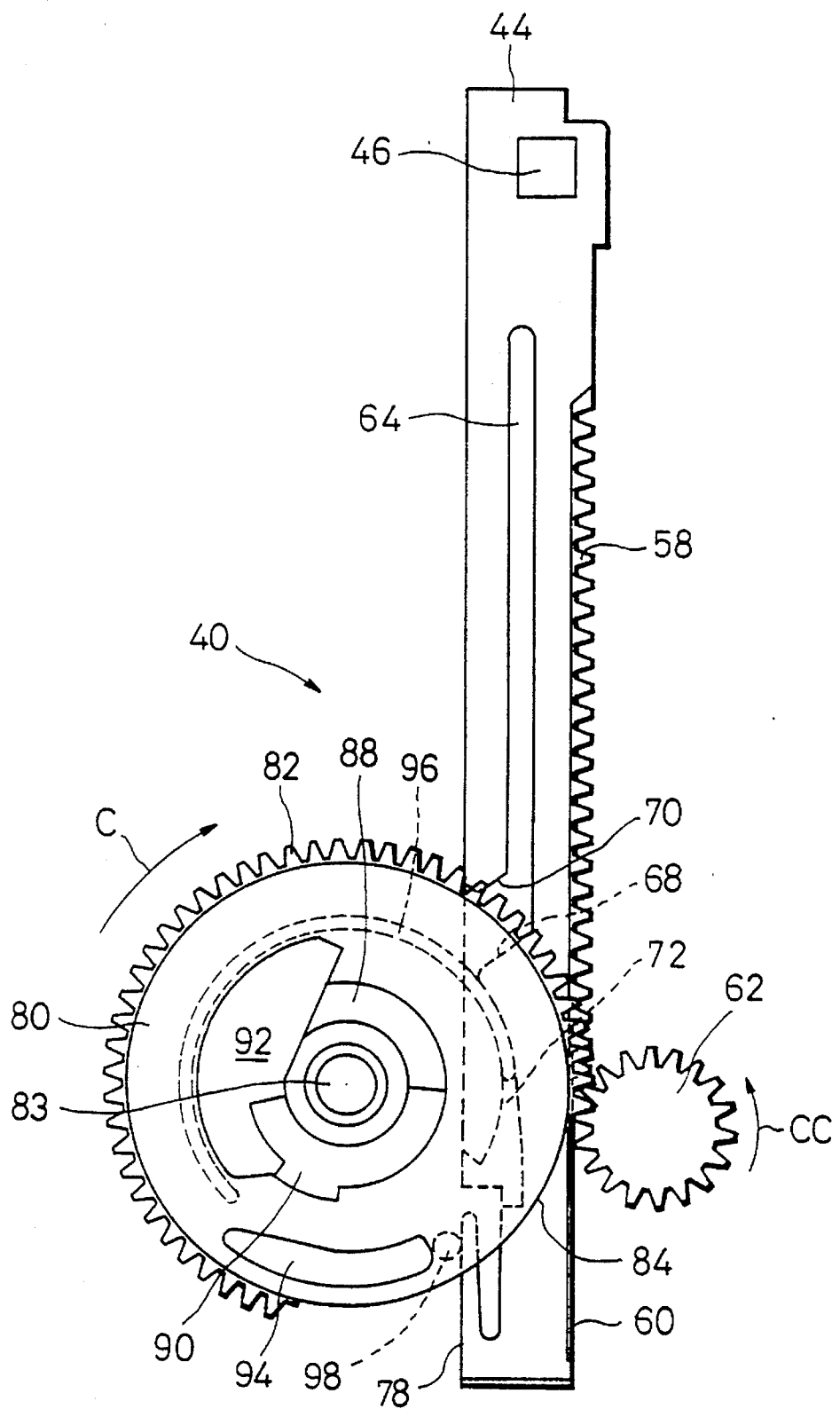
FIG. 15 is a plan view showing the drive section with the loader in its loading position.

When the ejector button is pushed after the reproduction of the CD is finished, the controller 106 executes the ejecting mode of FIG. 11. In the ejecting mode, when the eject switch 110 is turned on by the ejector button (Step 8), its on-signal is supplied to the controller 106. On receiving the off-signal from the switch 110, the controller 106 causes the motor 108 to rotate reversely (Step 9). In this case, the pinion 62 is rotated in the counterclockwise direction, as indicated by arrow CC in FIG. 15. Since the pinion 62 is already in engagement with the other end portion of the toothed portion 82 of the gear 80 at this time, the gear 80 is rotated in the clockwise direction indicated by arrow C. Thus, the projection 38 of the loader holder 24 gets out of the aperture 92 of the gear 80 and runs onto the lift cam 86. Then, the projection 38 moves relatively along the slant surface 90 of the cam 86 to reach the level surface 88. Accordingly, the reproduction unit 4 and the loader holder 24 are vertically separated, as shown in FIG. 2, so that the CD is released from the clamping action.

Figure 16:
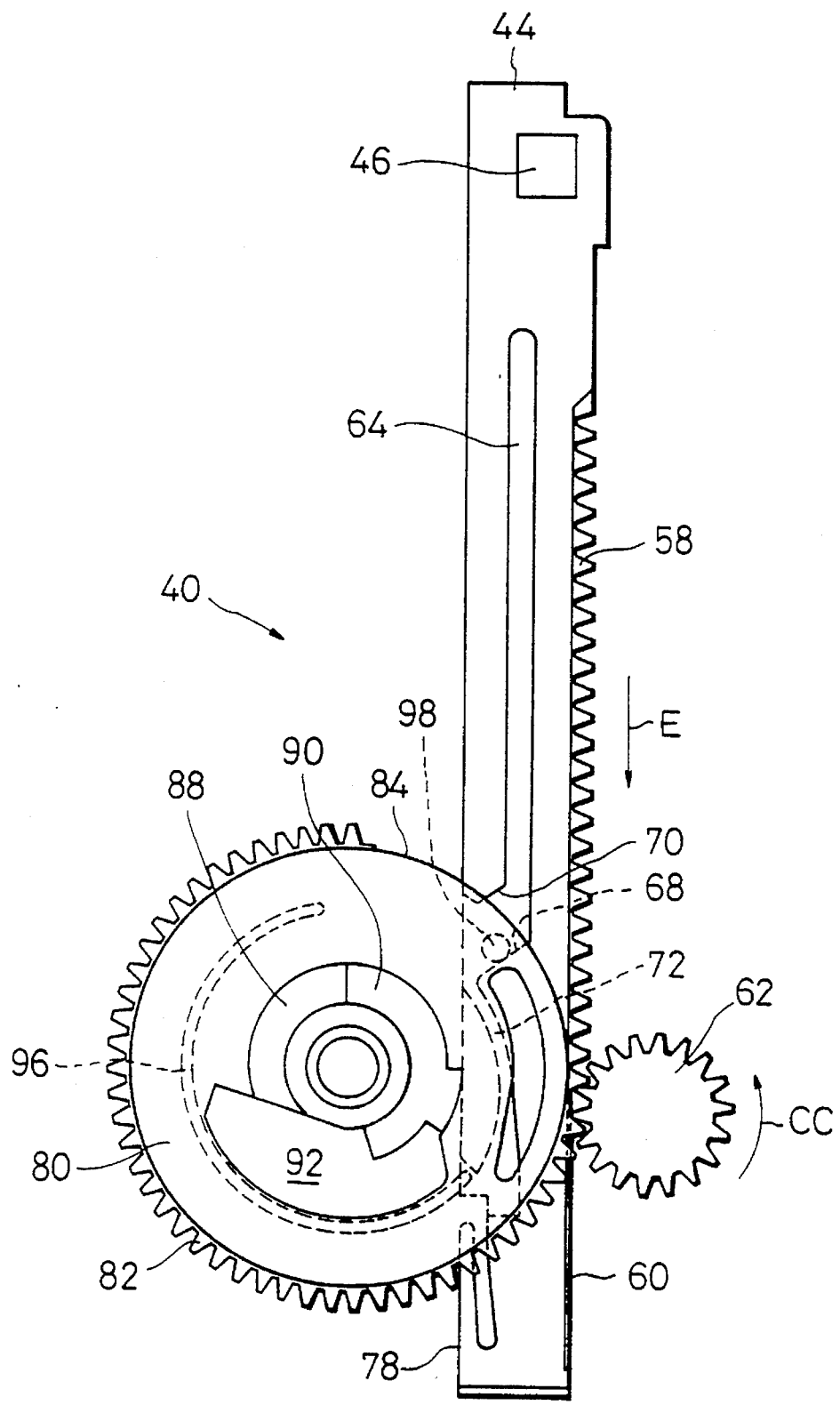
FIG. 16 is a view illustrating the way the rack in the state of FIG. 15 is returned in the CD ejection direction.

When the clockwise rotation of the gear 80 is continued, thereafter, the pin 98 of the gear 80 enters the slant groove 66 of the rack 44, and engages the first cam 68 of the groove 66. By doing this, the pin 98 pushes back the rack 44 in the direction of arrow E of FIG. 16. At this point of time, the ridge 96 of the gear 80 is entirely off the arcuate groove 72 of the rack 44, and never prevents the rack 44 from being pushed back.

When the rack 44 is pushed back, the row of the rack teeth 58 of the rack 44 engages the pinion 62 at its terminal, and the toothed portion 82 of the gear 80 entirely clears the pinion 62. Thus, the toothed portion 82 and the pinion 62 are disengaged from each other, so that the rotation of the gear 80 is stopped.

When the pinion 62 is further rotated in the counterclockwise direction, the rack 44 is moved in the direction of arrow E, and the pin 98 of the gear 80 abuts against the second cam face 70 of the slant groove 66. When the rack 44 is further moved in the direction of arrow E, therefore, the gear 80 rotates in the clockwise direction as the pin 98, guided by the cam face 70, gets into the open end of the locking groove 64 of the rack 44. When the counterclockwise rotation of the pinion 62 is continued, thereafter, the rack 44 is returned to its unloading position shown in FIG. 7. As this is done, the pin 98 of the gear 80 moves relatively in the locking groove 64 of the rack 44.

When the rack 44 reaches the unloading position so that the signal supplied from the loading switch 104 to the controller 106 is switched from on to off (Step 10), the controller 106 stops the drive of the motor 108.

According to the drive section 40 constructed in this manner, the rotation of the pinion 62 is transmitted alternatively to the rack 44 or the gear 80, so that no independent drive sources are required for the movement of the rack 44 and the rotation of the lifter cam 86. Since the mode of power transmission from the pinion 62 to the rack 44 or the gear 80 is changed by means of the groove, cam face, pin, ridge, etc. of the rack 44 or the gear 80, moreover, the power transmission change requires use of only a small number of components in the drive section 40.

Details of Loader Holder and Loader

Figure 17:
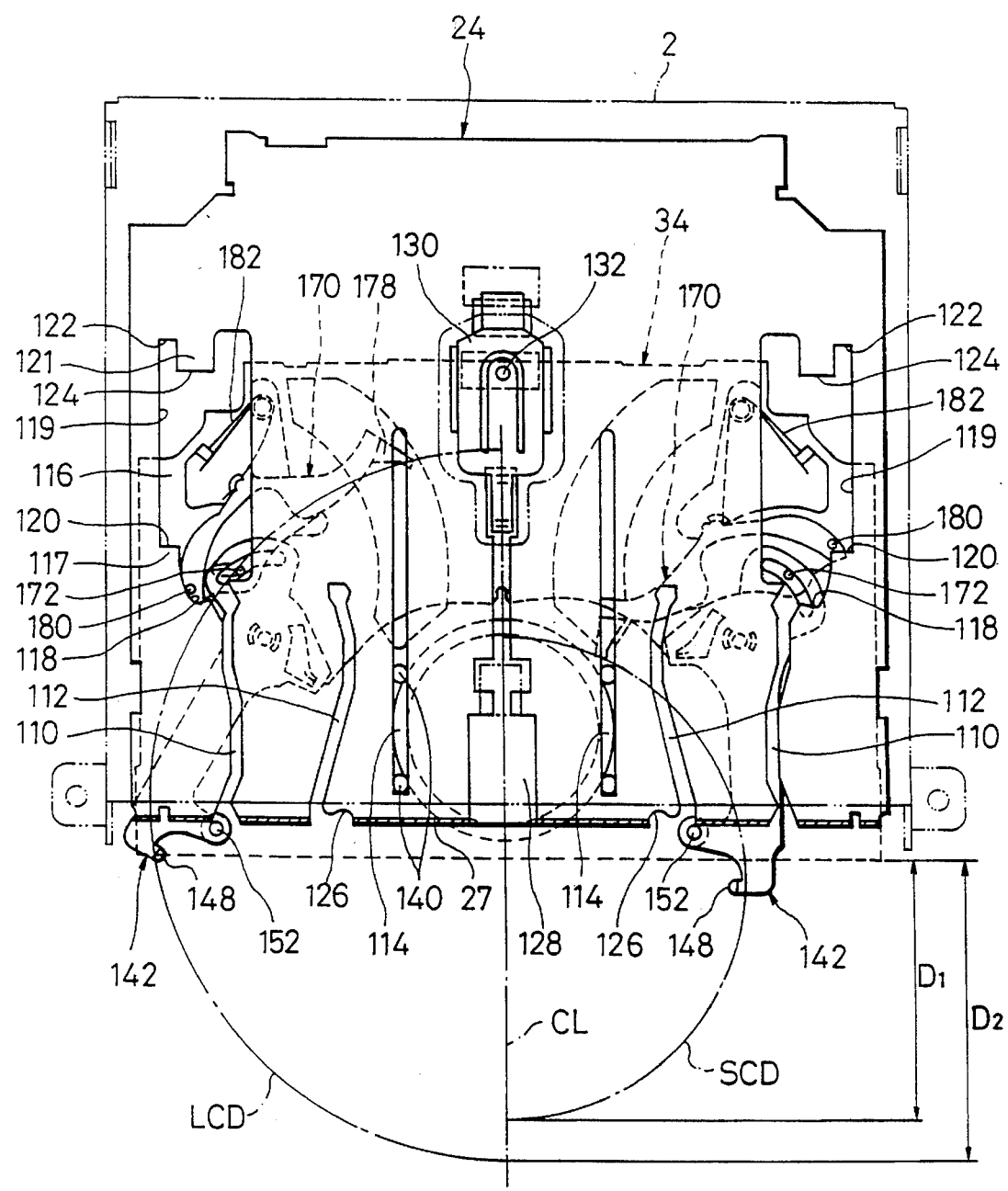
FIG. 17 is a plan view showing a loader holder.

Referring to FIG. 17, there is shown the loader 34 of the loader holder 24 into which a large compact disk (LCD) of 12-cm diameter or a small compact disk (SCD) of 8-cm can be inserted. In FIG. 17, the LCD and SCD are set in the left- and right-hand halves of the loader 34, respectively. An inserted state of the LCD or SCD is a state established immediately before the loader 34 is pushed in from the unloading position through the medium of the CD inserted by a user. Also, this state corresponds to a CD-ejected state, which will be mentioned later.

The loader holder 24 and the loader 34 are bilaterally symmetrical with respect to their center line CL. The following, therefore, is a description of the construction of the respective complementary halves of the loader holder 24 and the loader 34.

Three slots 110, 112 and 114 are formed in the top face of the loader holder 24, and they extend in the moving direction of the loader 34. One end of the outermost slot 110 opens in the front end edge of the loader holder 24, while the other end thereof communicates with an aperture 116 which extends along the center line CL. In FIG. 17, the visor portion 27 of the holder 24 is broken away to show the open end of the slot 110 clearly.

A front stop face 118, which is formed on the front-side end edge of the aperture 116, is situated adjacent to the other end of the slot 110. A side edge 119 of the aperture 116, which is continuous with the stop face 118, has a shoulder portion 117 in the middle. The shoulder portion 117 constitutes an intermediate stop face 120.

A lug 121 is formed on the rear edge of the aperture 116 so as to extend into the aperture 116. That portion of the rear edge of the aperture 116 which is situated between the lug 121 and the side edge 119 is formed a first halt face 122, the extreme end edge of the lug 121 as a second halt face 124.

Among the aforesaid three slots, the central slot 112, like the slot 110, has one end opening in the front end edge of the loader holder 24. A semicircular recess 126 is formed in the front end edge of the holder 24. In FIG. 17, the recess 126 is adjacent to the right-hand side of the open end of the slot 112. The slot 112 extends first toward the slot 114 and then away from the slot 114. The distance between the other end of the slot 112 and the front end edge of the loader holder 24 is substantially equal to the distance between the other end of the slot 110 and the front end edge of the holder 24.

The innermost slot 114, out of the three slots, has one end which is situated at a predetermined distance from the front end edge of the loader holder 24. Thus, the one end of the slot 114 does not open in the front end edge of the holder 24. The slot 114 extends straight along the moving direction of the loader 34 or CD insertion direction, beyond the other end of the slot 112.

Figure 18:
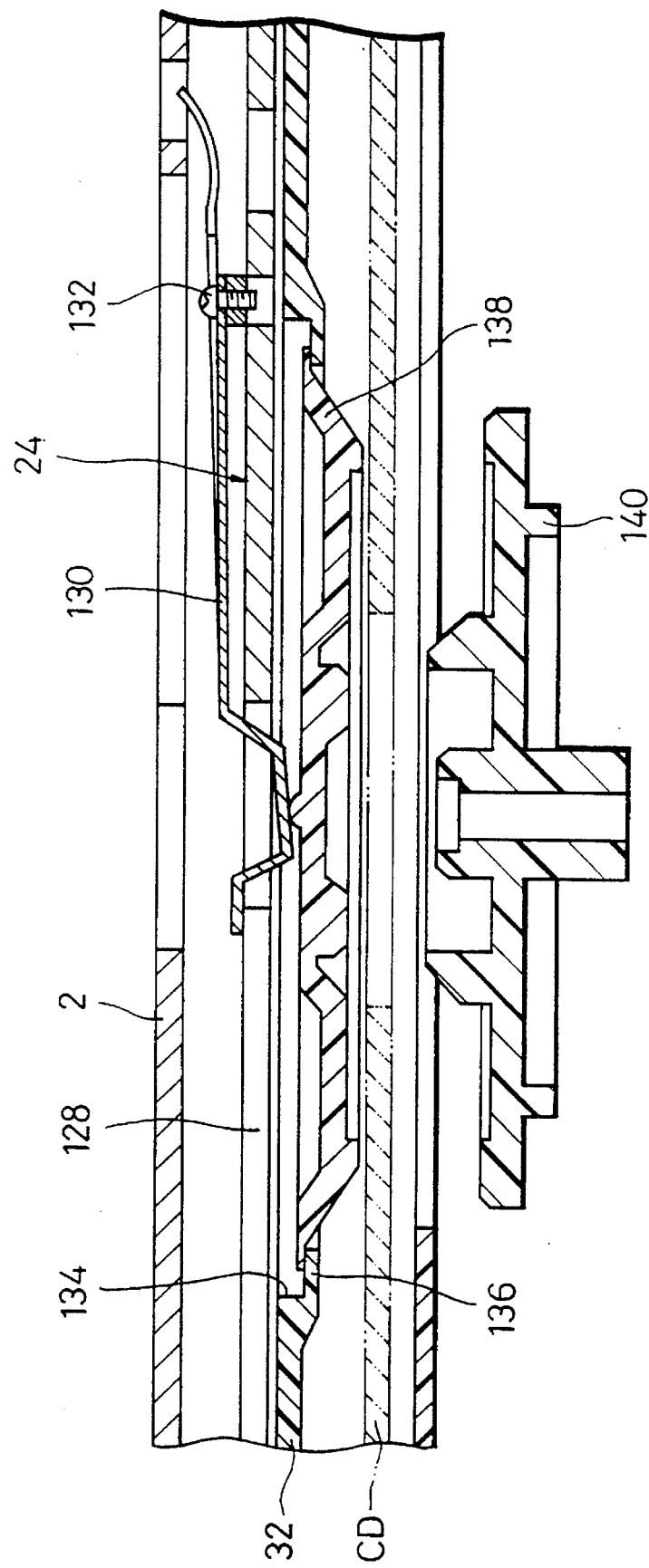
FIG. 18 is a sectional view showing part of the loader holder.

As shown in FIGS. 17 and 18, a center aperture 128 is formed in the top face of the loader holder 24. The center aperture 128 extends from the front end edge of the holder 24 toward the rear end edge thereof. A pressure spring 130 is fixed to the upper surface of the loader holder 24 by means of a screw 132. The spring 130 is formed of a leaf spring which is fabricated by blanking. The pressure spring 130 has an end portion which gets into the loader holder 24 through the rear-side end portion of the center aperture 128.

A circular hole 134 is formed in the top face of the loader 34, and an inner flange 136 is formed integrally on the lower end edge of the hole 134. A circular clamper 138 is inserted in the circular hole 134 from above, and is held in a manner such that its outer peripheral edge is caught by the inner flange 136 of the hole 134. As seen from FIG. 19, the circular hole 134 or the clamper 138 is located in the center of the front portion of the loader 34. When the loader 34 is moved to the loading position, therefore, it is situated over the turntable 140, as shown in FIG. 18. At this time, moreover, the loader 34 gets under the pressure spring 130, and is pressed down by the end portion of the spring 130.

Figure 19:
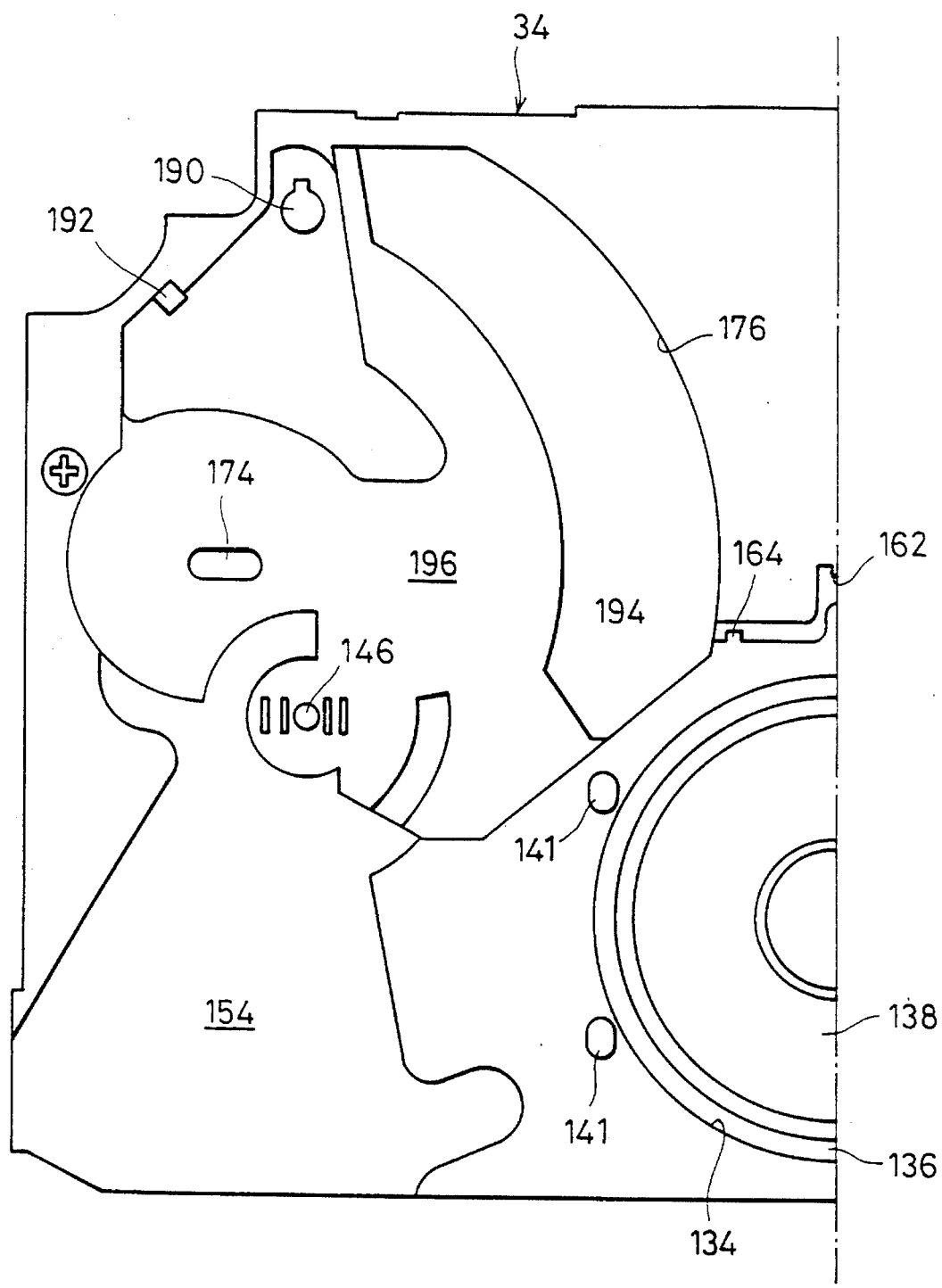
FIG. 19 is a plan view showing the left-hand half of the loader.

As seen from FIG. 19, two projections 141 are formed on those portions of the loader 34 which are situated outside the circular hole 134. The projections 141, which are spaced in the moving direction of the loader 34, are slidably fitted in the slot 114 of the loader holder 24. When the clamper 138 moves together with the loader 34, the projections 140 prevent it from slipping out of the circular hole 134.

Figure 20:
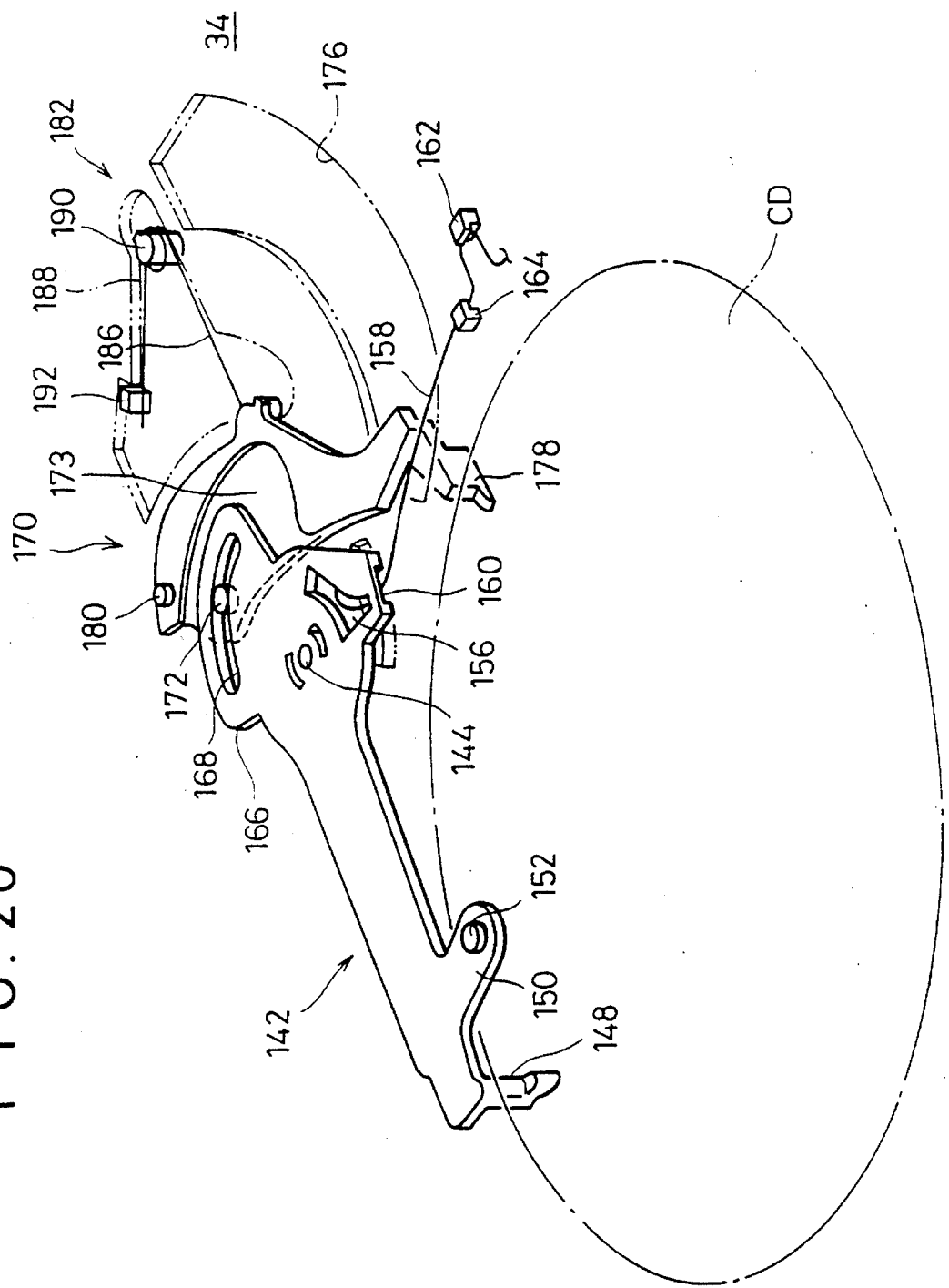
FIG. 20 is a perspective view showing front and rear levers attached to the left-hand half of the loader.

As shown in FIG. 20, a front lever 142 is rotatably mounted on the upper surface of the loader 34. The lever 142 is situated between the side wall of the loader 34 and the clamper 138, and extends in the moving direction of the loader 34. A shaft 144 is formed integrally on the rear end portion of the front lever 142. The shaft 144 protrudes downward from the lever 142, and is rotatably supported by means of the loader 34. More specifically, a bearing hole 146 is formed in the top face of the loader 34, as shown in FIG. 19, and the shaft 144 is fitted in the hole 146 for rotation.

The front end of the front lever 142 projects from the front end edge of the loader 34, and a disk hook 148 protrudes integrally from the front end. The disk hook 148 is directed to the clamper 138. Also, an arm portion 150 diverges integrally from the front end portion of the front lever 142, and extends toward the clamper 138. A circular projection 152 protrudes upward from the distal end of the arm portion 150. The projection 152 can get into the slot 110 or 112 of the loader holder 24.

A depression 154 (see FIG. 19) is formed in the upper surface of the loader 34, and the front lever 142 can rotate within the depression 154. The depression 154 allows the upper surface of the lever 142 to be flush with that of the loader 34. An arcuate anchor hole 156 is formed in the rear end portion of front lever 142. The hole 156 is situated nearer to the clamper 138 than the shaft 144. One end of a wire spring 158 is hooked to the anchor hole 156 from below. The spring 158 urges the front lever 142 to rotate in the counterclockwise direction of FIG. 20.

A groove 160 is formed in the lower surface of the rear end portion of the front lever 142, and the one end of the wire spring 158 is guided into the anchor hole 156 through the groove 160. The spring 158 extends in a direction perpendicular to the moving direction of the loader 34, that is, in the crosswise direction of the loader 34, and its central portion is U-shaped. The U-shaped portion of the wire spring 158 is fixed to a center projection 162, and a region near the U-shaped portion of the spring 158 is fixed by means of a side projection 164. The projections 162 and 164 are formed integrally on the upper surface of the loader 34.

Figure 21:
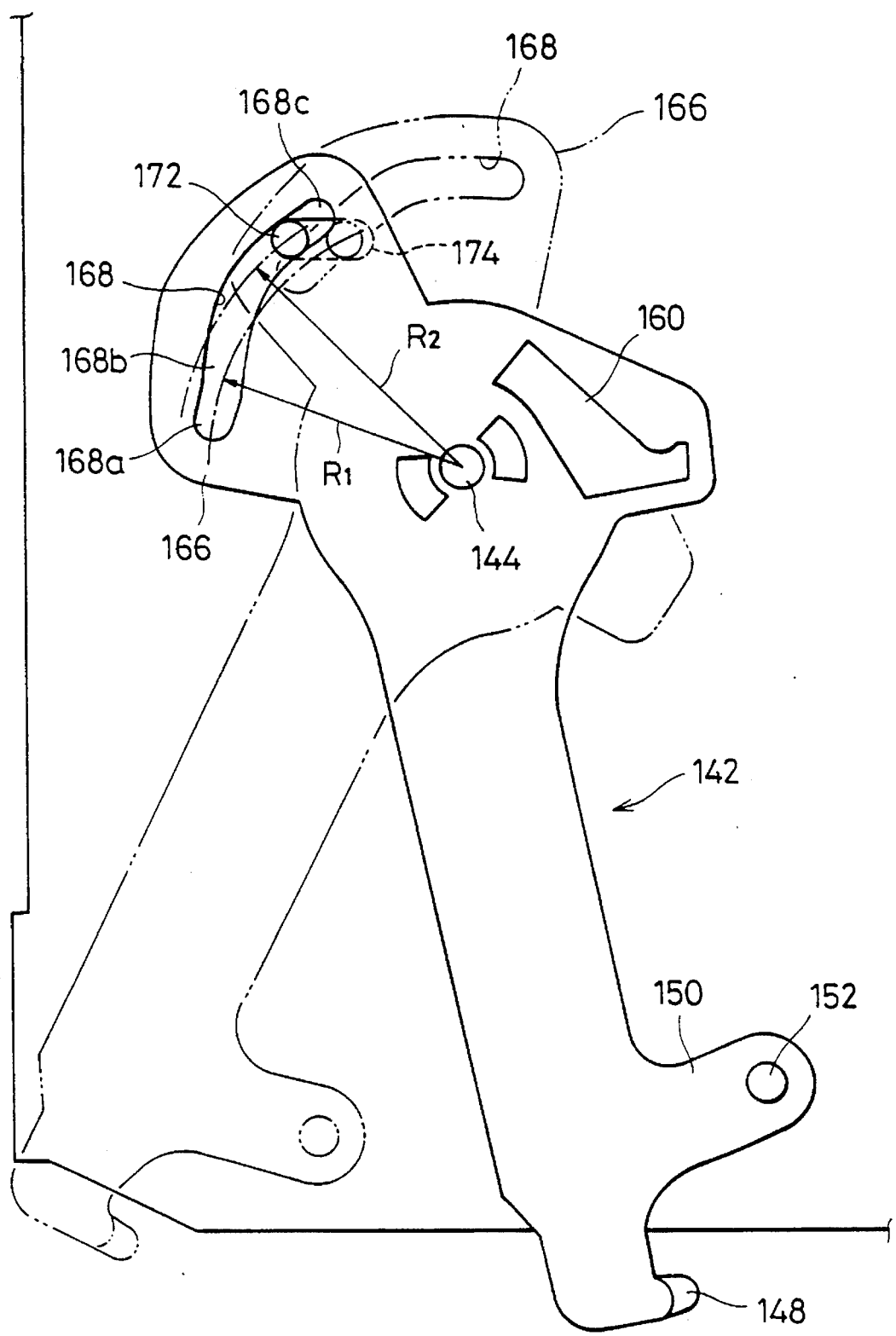
FIG. 21 is an enlarged plan view showing the front lever of FIG. 20.

As shown in detail in FIG. 21, a tail portion 166 extends from the rear end portion of the front lever 142, and an arcuate slit 168 is formed in the tail portion 166. The slit 168 includes a front portion 168a, a middle portion 168b, and a rear portion 168c, ranging from the front end side of the front lever 142. The front and rear portions 168a and 168c constitute parts of imaginary circles with radii R1 and R2, respectively, around the shaft 144 of the lever 142, the radius R2 being longer than the radius R1. The middle portion 168b smoothly connects the front and rear portions 168a and 168c.

As seen from FIG. 20, the tail portion 166 of the front lever 142 overlaps a rear lever 170, and a connecting shaft 172 of the rear lever 170 is slidably inserted in the slit 168 of the front lever 142. More specifically, the connecting shaft 172 projects from the upper and lower surfaces of the rear lever 170, respectively, and the upper end of the shaft 172 is inserted in the slit 168 from below.

As indicated by two-dot chain line in FIG. 21, an aperture 174 is formed in the top surface of loader 34, and the lower end of the connecting shaft 172 is slidably inserted in the aperture 174 from above. The aperture 174 extends in the crosswise direction of the loader 34. Referring to FIG. 19, the aperture 174 is indicated by full line.

When the front lever 142 is rotated in the position indicated by full line in FIG. 21, the connecting shaft 172 is situated at the left-hand end of the aperture 174. When the front lever 142 is rotated clockwise from the position indicated by full line to the position indicated by two-dot chain line, the inner edge of the slit 168 presses the shaft 172, so that the shaft 172 moves in the aperture 174 to be situated at the right-hand end thereof. As this is done, the rear lever 170 moves together with the connecting shaft 172.

As seen from FIG. 20, the rear lever 170 extends from the tail portion 166 of the front lever 142 toward the central portion of the loader 34. A depression 173 is formed in the upper surface of the rear lever 170, and the tail portion 166 of the front lever 142 overlies the depression 173. The depression 173 allows the respective upper surfaces of the front and rear levers 142 and 170 to be flush with each other.

As indicated by two-dot chain line in FIG. 20, an arcuate aperture 176 is formed in that portion of the top face of the loader 34 which is situated on the inner end side of the rear lever 170. A disk hook 178 protrudes integrally downward from the inner end of the rear lever 170, and gets into the loader 34 through the aperture 176. The hook 178 is directed to the front end edge of the loader 34.

A pivot pin 180 protrudes upward from the outer end of the rear lever 170. The upper end of the pin 180 is situated in the aperture 116 of the loader holder 24 (see FIG. 17).

A torsion coil spring 182 is located on the upper surface of the loader 34 between the rear lever 170 and the rear end edge of the loader 34. The spring 182 includes a coil portion 184 and a pair of arms 186 and 188. The coil portion 184 is fitted on a fixing pin 190 which protrudes from the upper surface of the loader 34. The distal end of the arm 186 of the coil spring 182 is connected to the rear lever 170, while that of the other arm 188 is held against a stopper 192 which protrudes from the upper surface of the loader 34.

The torsion coil spring 182 urges the rear lever 170 to rotate toward the center of the loader 34, thereby causing the top portion of the disk hook 178 of the rear lever 170 to engage a front end edge 194 of the aperture 176.

Referring to FIG. 19, the aperture 176 is indicated by full line, and extends in a circular arc from a position near the clamper 138 toward the rear end edge of the loader 34. Also, a depression 196 for receiving the rear lever 170 is formed in the upper surface of the loader 34. This depression 196 is deeper than the depression 154 for receiving the front lever 142, so that the upper surface of the rear lever 170, like that of the front lever 142, is allowed to be flush with that of the loader 34.

Loading of Small Compact Disk

Referring now to FIGS. 20 to 23, the way of loading the small compact disk or SCD will be described.

Figure 22:
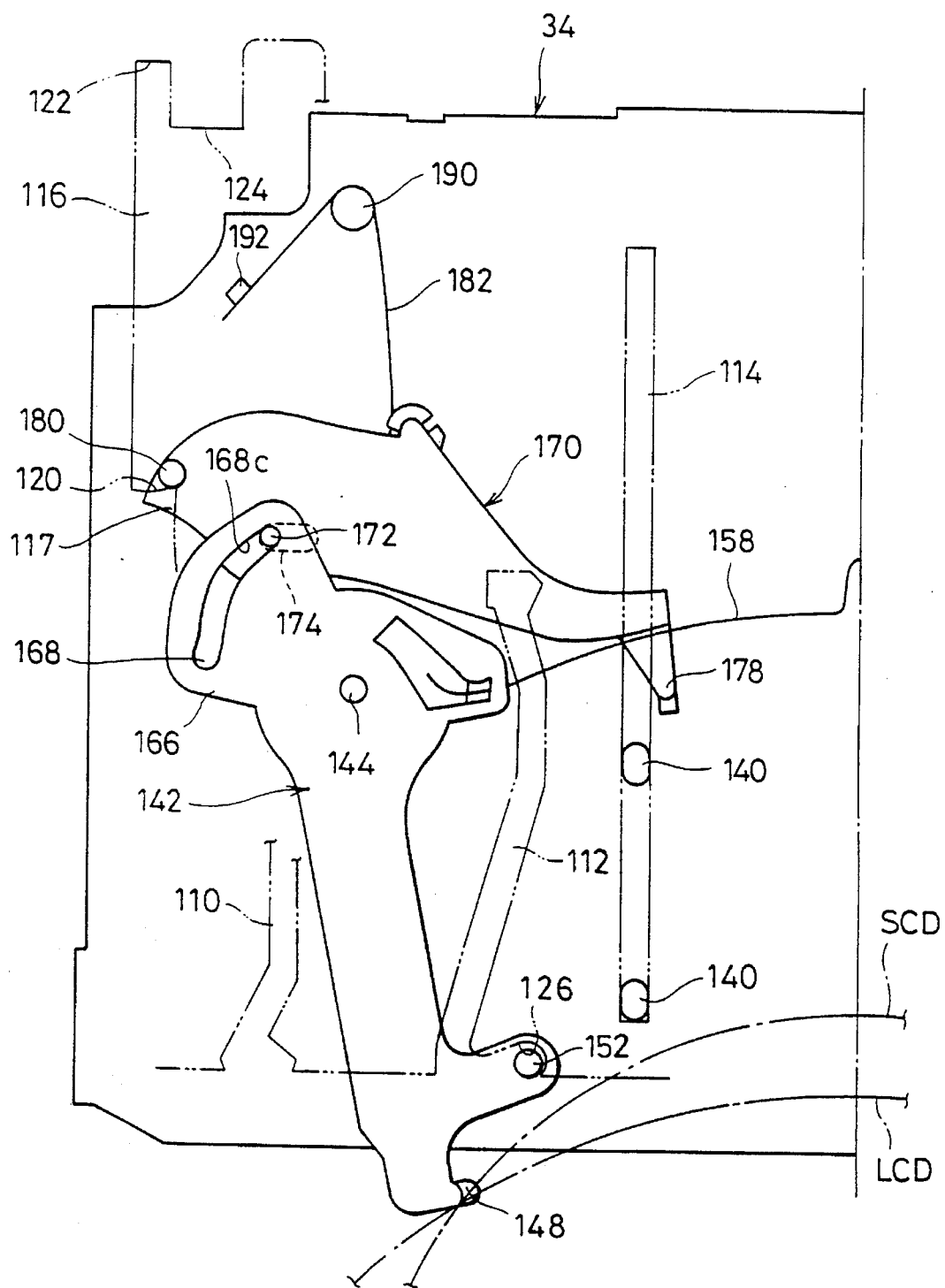
FIG. 22 is a plan view showing the front and rear levers without any CD in the loader.

FIG. 22 shows a state in which the loader 34 is in the unloading position and the SCD is not inserted in the loader 34 yet. In this state, the front lever 142 is rotated in the counterclockwise direction by the urging force of the wire spring 158 so that its projection 152 is situated in the recess 126 in the front end edge of the loader 34. The upper end of the connecting shaft 172 of the rear lever 170 is situated in the rear portion 168c of the slit 168 of the front lever 142, while the lower end thereof is situated at the left-hand end of the aperture 174 of the loader 34.

In the state shown in FIG. 22, moreover, the pivot pin 180 and the disk hook 178 of the rear lever 170 are pressed against the intermediate stop face 120 of the aperture 116 of the loader holder 24 and the front end edge 194 of the aperture 176 of the loader 34, respectively, by the urging force of the torsion coil spring 182.

When the user inserts the SCD into the loader 34 in the state of FIG. 22, the outer peripheral edge of the SCD is held in position by the disk hook 148 of the front lever 142 from below. When the SCD is inserted deeper, it causes the front lever 142 to rotate in the clockwise direction against the urging force of the wire spring 158, so that the projection 152 of the lever 142 is disengaged from the recess 126 of the loader 34. When the outer peripheral edge of the SCD reaches the disk hook 178 of the rear lever 170, thereafter, it is held in position by the hook 178 from below. Thus, a half of the SCD is held by means of the respective disk hooks 148 and 178 of the front and rear levers 142 and 170, as shown in FIG. 23.

Figure 23:
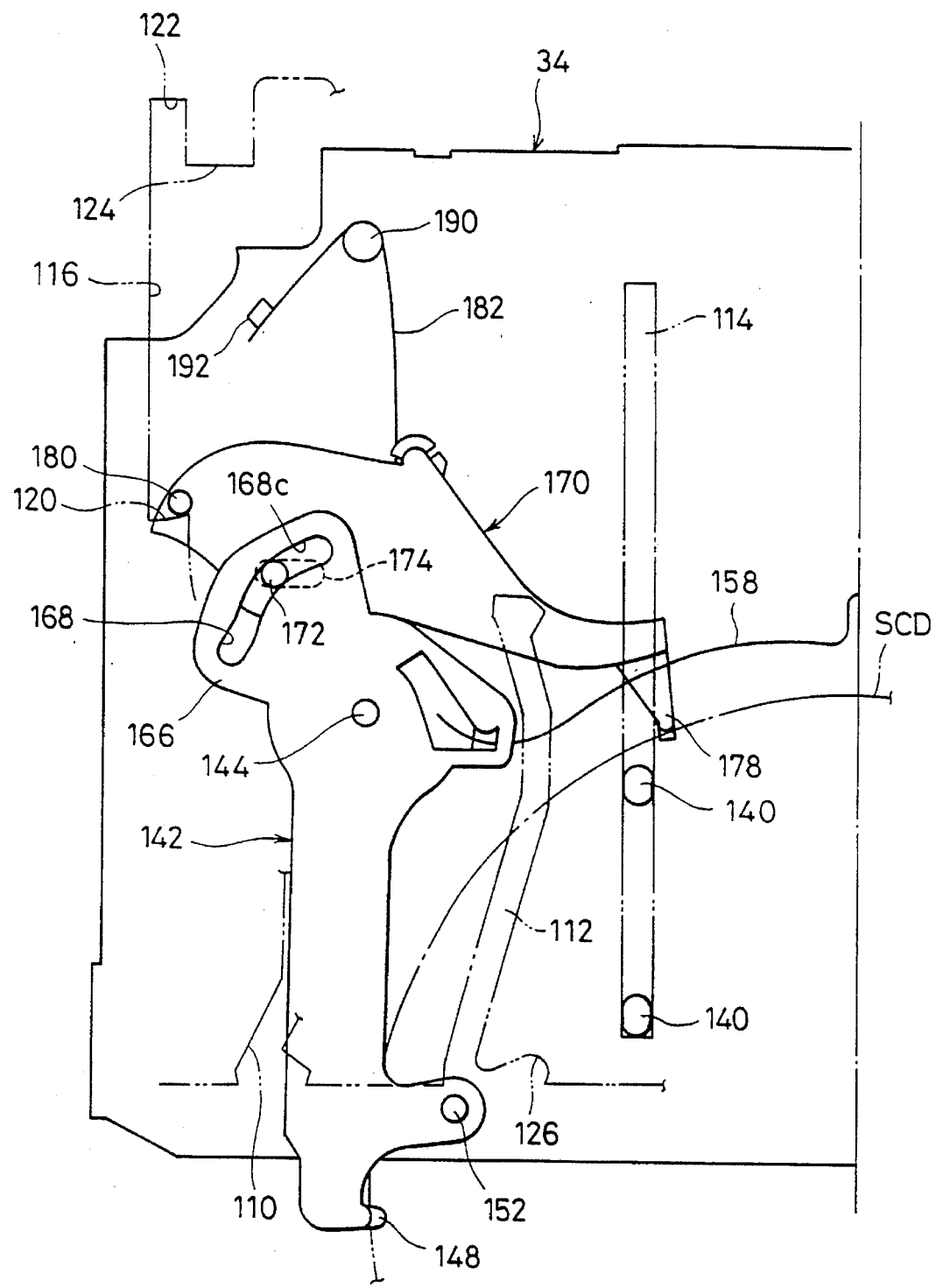
FIG. 23 is a view illustrating the way a small CD in the state of FIG. 22 is inserted into a position corresponding to its ejected state.

It is to be noted here that the state of FIG. 23 corresponds to the ejected state for the SCD to be ejected from the loader 34, which is shown in the right-hand half of FIG. 17, and the SCD of 8-cm diameter is inserted in the loader 34 with its center just inside the disk hook 148 of the front lever 142. Thus, the respective disk hooks 148 and 178 of the front and rear levers 140 and 170 hold the SCD on either side of the SCD center with respect to the moving direction of the loader 34. In this state, the SCD projects from the loader 34 for a distance D1 (4 cm) about half its diameter, as shown in FIG. 17.

As the SCD in the state of FIG. 23 is further inserted into the loader 34, the front lever 142 is rotated in the counterclockwise direction by the urging force of the wire spring 158, while the SCD pushes in the disk hook 178 of the rear lever 170. Since the connecting shaft 172 of the rear lever 170 is then situated at the left-hand end of the aperture 174 of the loader 34, the lever 170 cannot move to the left of FIG. 23, and its pivot pin 180 is in contact with the intermediate stop face 120 of the aperture 116 of the loader holder 24. Accordingly, the rear lever 170 is rotated in the counterclockwise direction around the pin 180, against the urging force of the torsion coil spring 182, in a manner such that the pin 180 presses the stop face 120. Even though the intermediate stop face 120 is pressed by the pivot pin 180, the loader holder 24 cannot move in the moving direction of the loader 34. Therefore, the counterclockwise rocking motion of the rear lever 170 causes the loader 34 to be pushed into the loader holder 24 through the medium of the connecting shaft 172.

When the rack 44 connected to the loader 34 moves as the loader 34 is pushed into the loader holder 24 in this manner, this movement is detected by the loading switch 104, and the driving force of the motor 108 is supplied to the loader 34. Accordingly, the loader 34, along with the rack 44, moves from the unloading position toward the loading position.

As the SCD and the loader 34 are further inserted and moved, respectively, the front and rear levers 142 and 170 draw the SCD into the loader holder 24 in a manner such that the SCD is held between their disk hooks 148 and 178.

As this is done, the projection 152 of the front lever 142 gets into the slot 112 of the loader holder 24 through the open end thereof, and moves guided in the slot 112.

Figure 24:
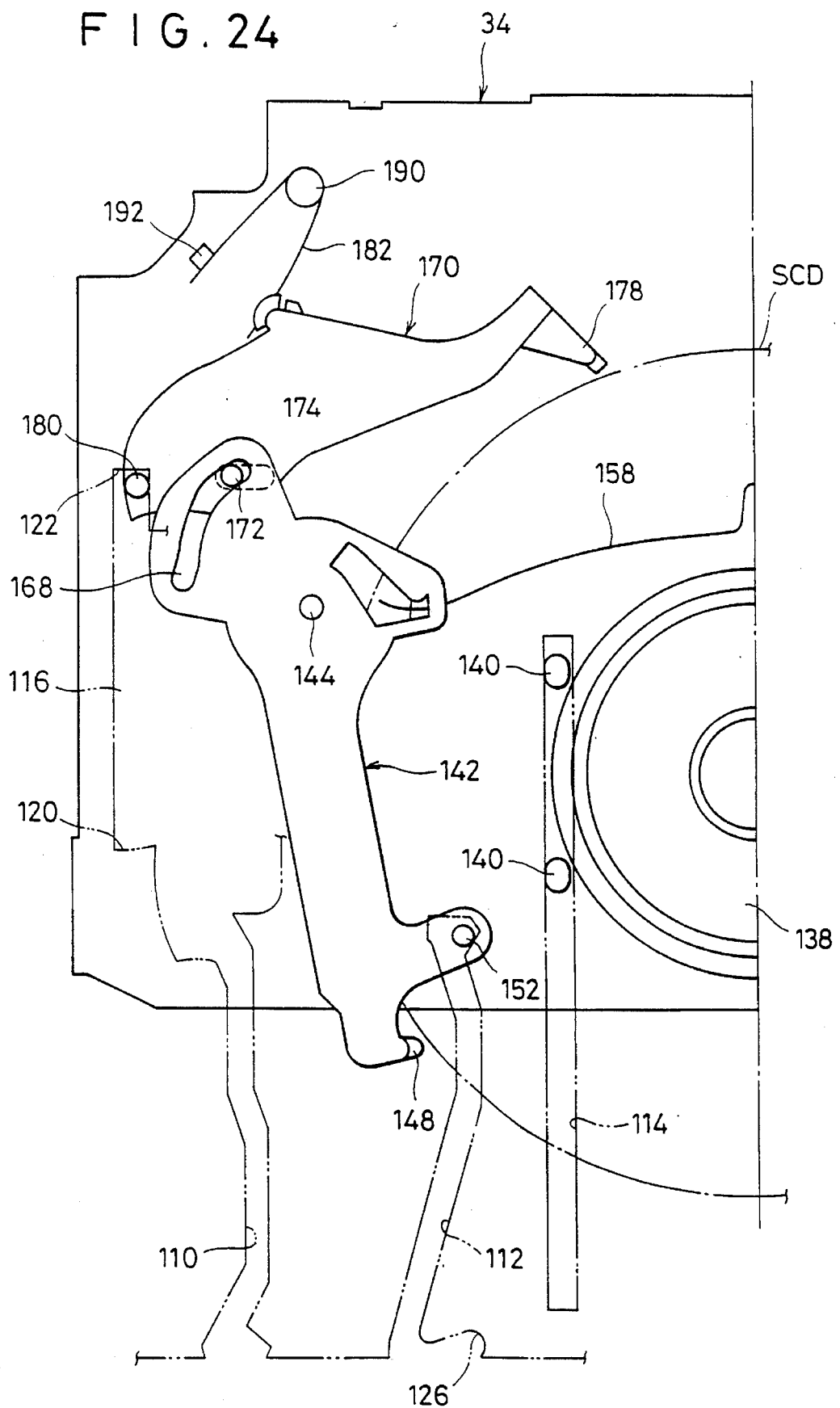
FIG. 24 is a view illustrating the way the loader in the state of FIG. 23 is moved to the loading position.

Immediately before the loader 34 reaches the loading position, the pivot pin 180 of the rear lever 170 abuts against the first halt face 122 of the aperture 116 of the loader holder 24, so that the lever 170 is rotated in the counterclockwise direction around the pin 180. In consequence, the disk hook 178 of the rear lever 170 leaves the outer peripheral edge of the SCD when the loader 34 reaches the loading position, as shown in FIG. 24. When the loader 34 reaches the loading position, on the other hand, the projection 152 of the front lever 142 is situated at the rear end portion of the slot 112. In this state, the rear end portion of the slot 112, in conjunction with the projection 152, prevents the front lever 142 from rotating in the counterclockwise direction, and keeps the disk hook 148 of the lever 142 away from the outer peripheral edge of the SCD. When the loading position is reached by the loader 34, therefore, the disk hooks 148 and 178 of the front and rear levers 148 and 170 are both separated from the outer peripheral edge of the SCD. Thus, the hooks 148 and 178 never interfere with the SCD during the subsequent SCD clamping operation and the rotation of the SCD for reproduction.

The front and rear levers 148 and 170 are arranged symmetrically on the either side of the loader 34. In loading the SCD, therefore, these levers 148 and 170 on the left- and right-hand sides cooperate with one another to draw the SCD into the loader holder 24 while centering the center hole of the SCD. Thus, when the loader 34 reaches the loading position, the axis of the center hole of the SCD is aligned with that of the turntable 140.

Ejection of Small Compact Disk

When the ejector button is pushed after the reproduction of the SCD is finished, the SCD is separated from the surface of the turntable 140 (state of FIG. 24), as mentioned before. When the loader 34 in this state, along with the rack 44, is drawn out toward the front portion of the loader holder 24, the rear lever 170 is first rotated in the clockwise direction around the pivot pin 180 by the urging force of the torsion coil spring 182. Thereupon, the disk hook 178 of the lever 170 holds again the outer peripheral edge of the SCD, and pushes out the SCD slightly. As a result, the projection 152 of the front lever 142, in the slot 112 of the loader holder 24, moves from the rear end portion of the slot 112 toward the front end portion. Thus, the front lever 142 is allowed to be urged in the counterclockwise direction by the urging force of the wire spring 158, and the disk hook 148 of the lever 142 also holds the outer peripheral edge of the SCD.

Accordingly, the SCD, along with the loader 34, is drawn out in a manner such that it is held by means of the disk hooks 148 and 178 of the front and rear levers 142 and 170.

When the loader 34 is drawn out to the unloading position, thereafter, the pivot pin 180 of the rear lever 170 abuts against the intermediate stop face 120 of the loader holder 24. Accordingly, the lever 170 is rotated in the clockwise direction around the pin 180 by the urging force of the torsion coil spring 182, and its disk hook 178 pushes out the SCD from the loader 34. Thus, the SCD is brought to the ejected state shown in FIG. 23, projecting from the loader 34 by D1.

When the user takes out the SCD entirely from the loader 34, thereafter, the front and rear levers 142 and 170 are restored to the state shown in FIG. 22.

Loading of Large Compact Disk

Referring now to FIGS. 20 and 23 to 26, the way of loading the large compact disk or LCD will be described.

Before the LCD is inserted into the loader 34, the loader 34 and the front and rear levers 142 and 170 are in the state shown in FIG. 22.

When the user inserts the LCD into the loader 34 in the state of FIG. 22, the outer peripheral edge of the LCD is held in position by the disk hook 148 of the front lever 142 from below. When the LCD is inserted deeper, it causes the front lever 142 to rotate in the counterclockwise direction against the urging force of the wire spring 158, so that the projection 152 of the lever 142 is disengaged from the recess 126 of the loader 34.

Since the diameter of the LCD is greater than that of the SCD, the front lever 142 is rotated extensively in the counterclockwise direction. Accordingly, the tail portion 166 of the lever 142, that is, the inner wall of the slit 168, pushes the connecting shaft 172 to the right, as shown in FIG. 25, so that the shaft 172 moves in the aperture 174 from the left-hand end thereof toward the right-hand end.

Figure 25:
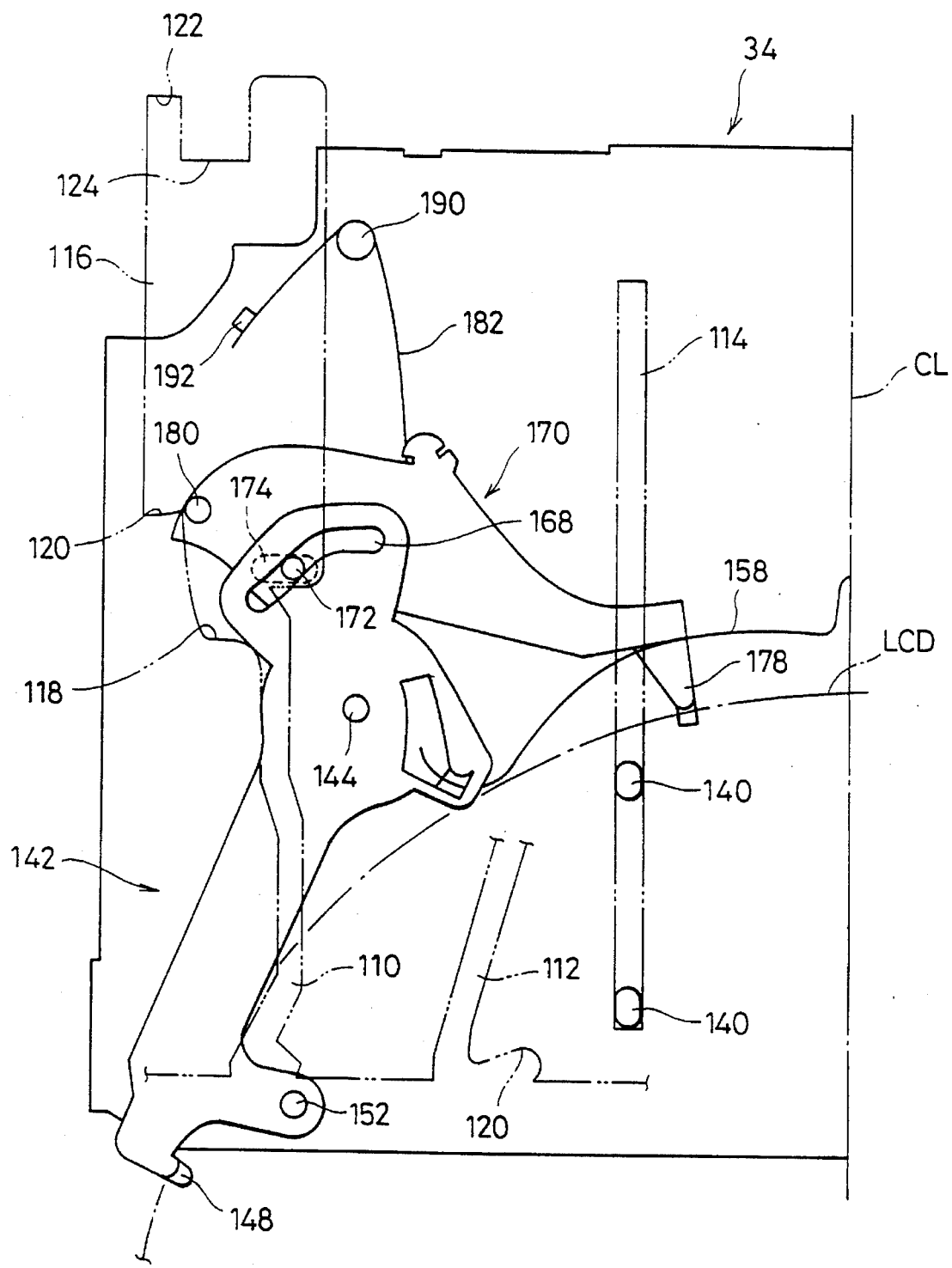
FIG. 25 is a view showing the way the rear lever is inserted from the state of FIG. 22 as a large CD is inserted.

As the connecting shaft 172 moves in this manner, the whole rear lever 170 moves toward the center line CL of the loader 34, as shown in FIG. 25, so that the pivot pin 180 of the lever 170 is disengaged from the intermediate stop face 120 of the loader holder 24.

When the outer peripheral edge of the LCD reaches the disk hook 178 of the rear lever 170, thereafter, it is held in position by the hook 178 from below. Thus, the LCD, like the SCD, is held by means of the respective disk hooks 148 and 178 of the front and rear levers 142 and 170, as shown in FIG. 25. In this state, the center of the LCD is outside the hook 148 of the front lever 142.

As the LCD in the state of FIG. 25 is further inserted into the loader 34, it causes the rear lever 170 to rotate in the counterclockwise direction against the urging force of the torsion coil spring 182. Since the pivot pin 180 of the lever 170 is then disengaged from the intermediate stop face 120 of the loader holder 24, as mentioned before, the lever 170 is rotated around the connecting shaft 172 so that the pin 180 abuts against the front stop face 118 of the holder 24, as shown in FIG. 26.

It is to be noted here that the state of FIG. 25 corresponds to the ejected state for the LCD to be ejected from the loader 34, which is shown in the left-hand half of FIG. 17, and the LCD of 12-cm diameter is inserted in the loader 34 with its center inside the disk hook 148 of the front lever 142. Thus, the respective disk hooks 148 and 178 of the front and rear levers 140 and 170 hold the LCD on either side of the LCD center with respect to the moving direction of the loader 34. In this state, the LCD projects from the loader 34 for a distance D2 (5 cm), as shown in FIG. 17.

Figure 26:
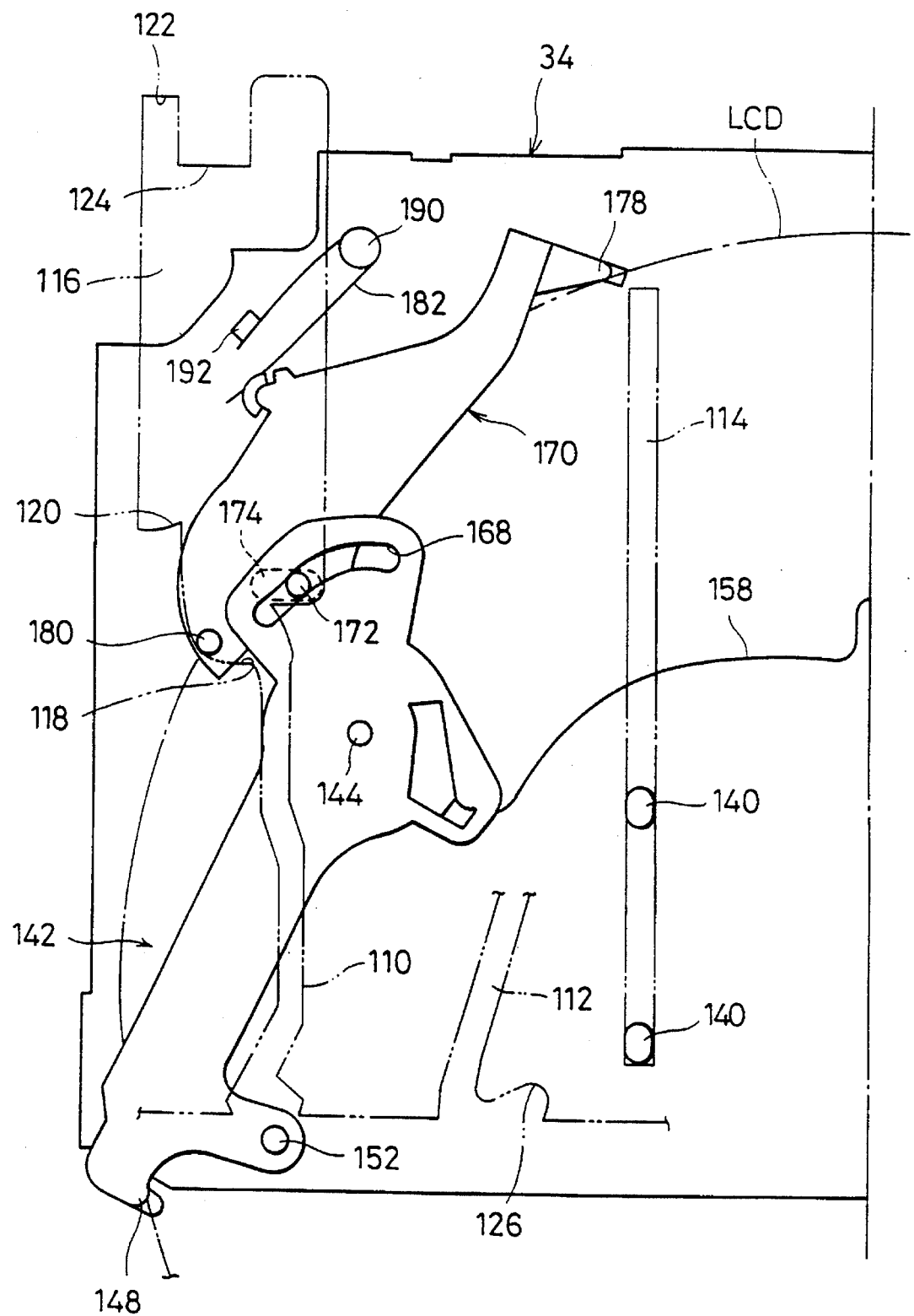
FIG. 26 is a view showing the way the large CD in the state of FIG. 25 is further inserted into the position corresponding to the ejected state.
Figure 27:
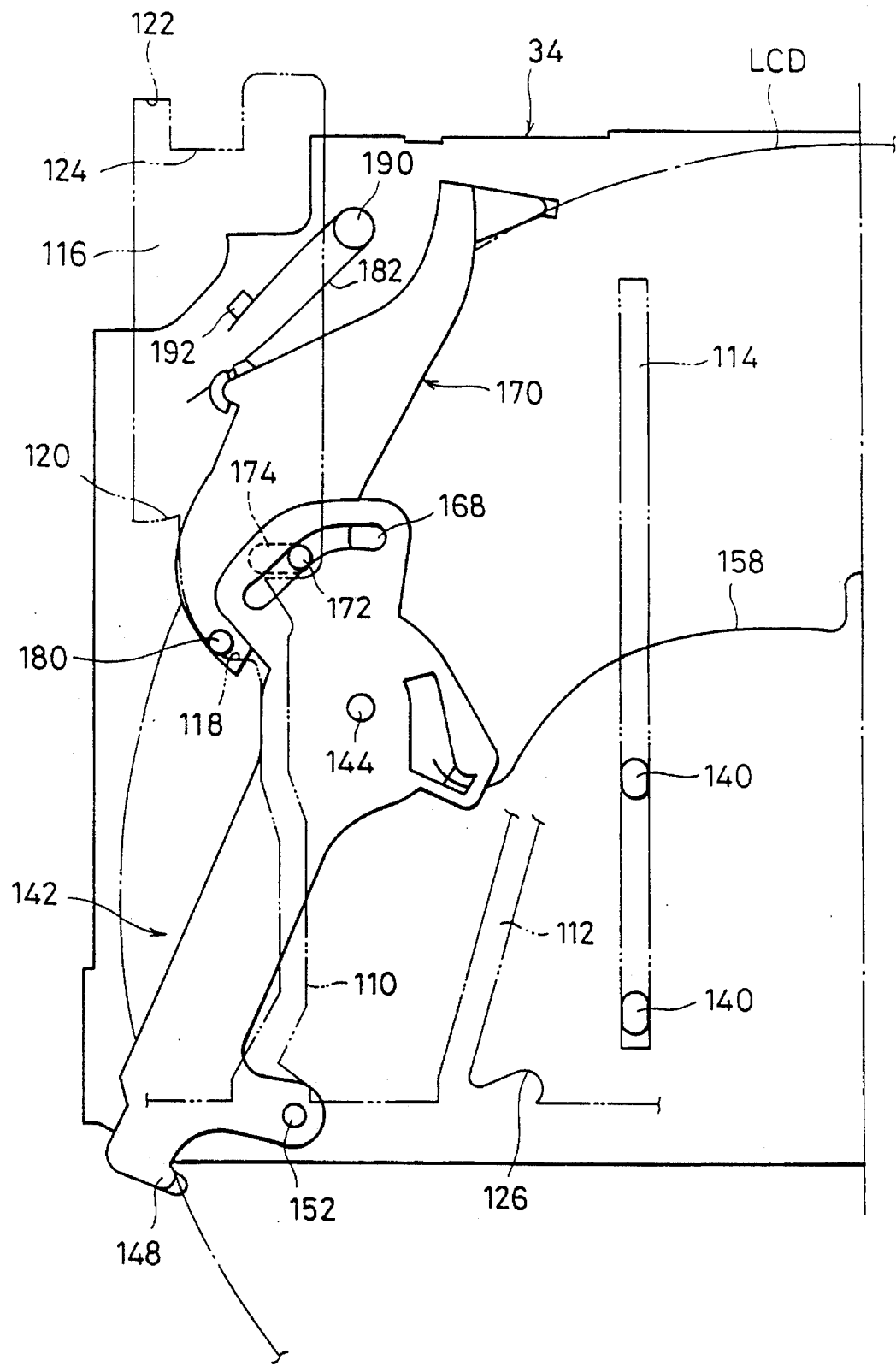
FIG. 27 is a view showing the way the large CD in the state of FIG. 26 is further inserted.

As the LCD in the state of FIG. 26 is further inserted into the loader 34, it causes the rear lever 170 to rotate in the counterclockwise direction around the pivot pin 180. As the lever 170 rocks in this manner, its pin 180 presses the front stop face 118 of the loader holder 24, so that the loader 34 is pushed into the holder 24, as shown in FIG. 27.

When the rack 44 connected to the loader 34 moves as the loader 34 is pushed into the loader holder 24 in this manner, this movement is detected by the loading switch 104, as mentioned before, and the driving force of the motor 108 is supplied to the loader 34. Accordingly, the loader 34, along with the rack 44, moves from the unloading position toward the loading position. As the loader 34 moves, therefore, the LCD, like the SCD, is drawn into the loader holder 24 in a manner such that it is held between the disk hooks 148 and 178 of the front and rear levers 142 and 170.

When the pivot pin 180 of the rear lever 170 abuts against the second halt face 124 of the loader holder 24 immediately before the loader 34 reaches the loading position, the lever 170 rotates in the counterclockwise direction around the pin 180. Accordingly, the disk hook 178 of the rear lever 170 leaves the outer peripheral edge of the LCD.

On the other hand, the front lever 142 is rotated extensively, as shown in FIG. 26. When the LCD in the state of FIG. 26 is further inserted, therefore, the projection 152 of the lever 142 gets into the slot 110 of the loader holder 24 through the open end thereof, and moves guided in the slot 110.

Figure 28:
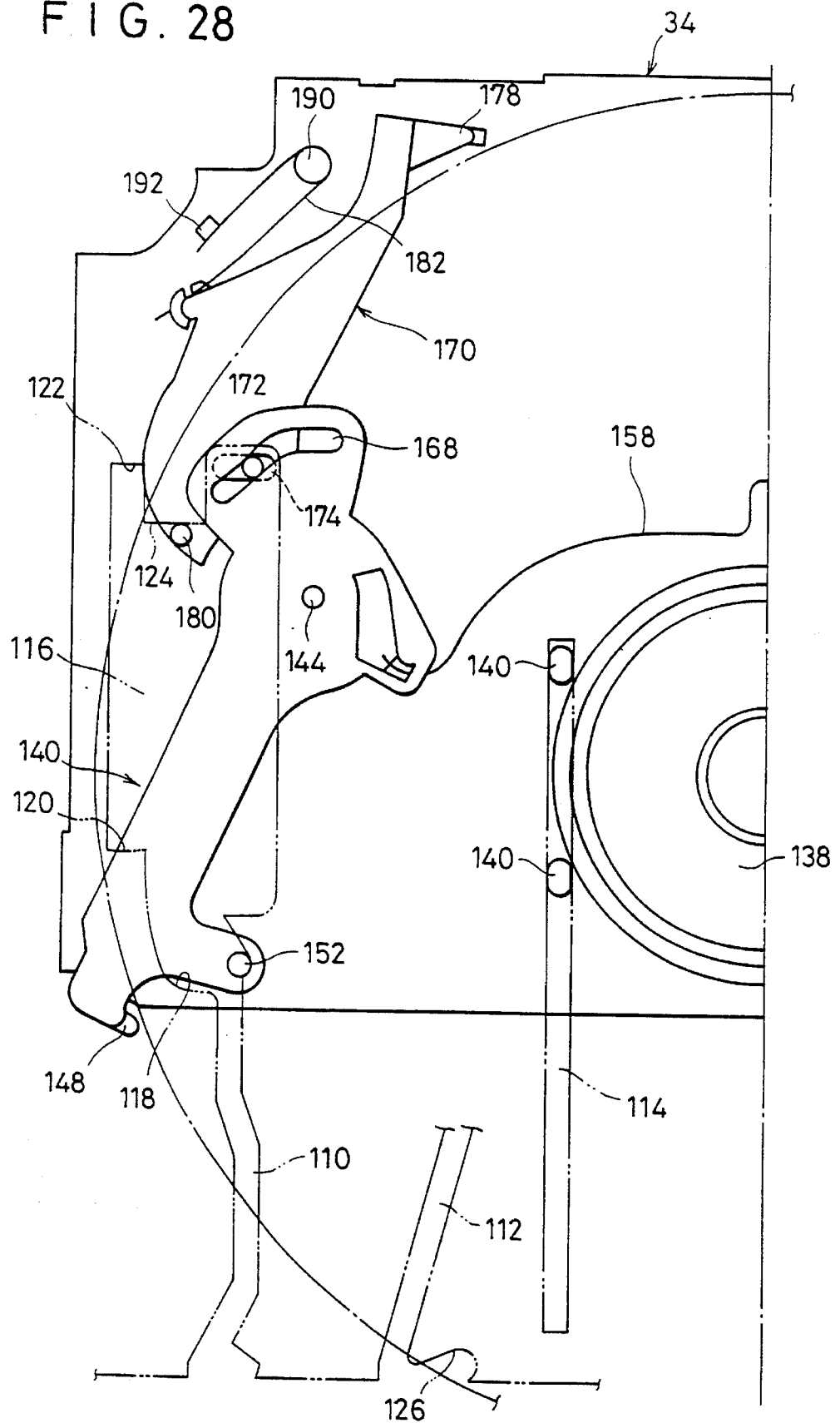
FIG. 28 is a view showing the way the loader in the state of FIG. 27 is moved to the loading position.

When the loader 34 reaches the loading position, the projection 152 of the front lever 142 gets into the aperture 116 through the slot 110, and is held on the inner edge of the aperture 116. In this state, the inner edge of the aperture 116, in conjunction with the projection 152, prevents the front lever 142 from rotating in the counterclockwise direction, and keeps the disk hook 148 of the lever 142 away from the outer peripheral edge of the LCD. When the loading position is reached by the loader 34, therefore, the disk hooks 148 and 178 of the front and rear levers 148 and 170 are both separated from the outer peripheral edge of the LCD, as shown in FIG. 28. Thus, the hooks 148 and 178 never interfere with the LCD during the subsequent LCD clamping operation and the rotation of the LCD for reproduction.

In loading the LCD, moreover, the front and rear levers 148 and 170 on the left- and right-hand sides cooperate with one another to draw the LCD into the loader holder 24 while centering the center hole of the LCD. Thus, when the loader 34 reaches the loading position, the axis of the center hole of the LCD is aligned with that of the turntable 140.

Ejection of Large Compact Disk

When the ejector button is pushed after the reproduction of the LCD is finished, the LCD is separated from the surface of the turntable 140 (state of FIG. 28). When the loader 34 in this state, along with the rack 44, is drawn out toward the front portion of the loader holder 24, the rear lever 170 is first rotated in the clockwise direction around the pivot pin 180 by the urging force of the torsion coil spring 182. Thereupon, the disk hook 178 of the lever 170 holds again the outer peripheral edge of the LCD, and pushes out the LCD slightly. As a result, the projection 152 of the front lever 142 gets into the slot 110 through the aperture 116 of the loader holder 24, and moves in the slot 110. Thus, the front lever 142 is allowed to be urged in the counterclockwise direction by the urging force of the wire spring 158, and the disk hook 148 of the lever 142 also holds the outer peripheral edge of the LCD.

Accordingly, the LCD, along with the loader 34, is drawn out in a manner such that it is held by means of the disk hooks 148 and 178 of the front and rear levers 142 and 170.

When the loader 34 is drawn out to the unloading position, thereafter, the pivot pin 180 of the rear lever 170 abuts against the front stop face 118 of the loader holder 24. Accordingly, the lever 170 is rotated in the clockwise direction around the pin 180 by the urging force of the torsion coil spring 182, and its disk hook 178 pushes out the LCD from the loader 34. Thus, the LCD is brought to the ejected state shown in FIG. 26, projecting from the loader 34 by D2.

When the user takes out the LCD entirely from the loader 34, thereafter, the front and rear levers 142 and 170 are restored to the state shown in FIG. 22.

What is claimed is:

1. A disk loading/unloading apparatus for a disk player, comprising a loader holder;

a loader supported for movement between an unloading position and a loading position in said loader holder and having a loading/ejecting opening and a disk insertion plane extending therein from the opening such that a disk is allowed to be inserted into said loader along the disk insertion plane from the opening, said loader including detecting means for detecting an outside diameter of a disk as the disk is inserted into said loader in the unloading position through the opening, said detecting means having a moving member adapted to be pressed by an outer peripheral edge of the inserted disk and be moved in a direction intersecting the direction of insertion of the disk within the disk insertion plane as the disk is inserted into said loader; and trigger means for pushing said loader in the unloading position toward the loading position along with the inserted disk when the insertion portion of the inserted disk exceeds a trigger distance determined in accordance with the outer diameter of the inserted disk, the inserted disk having the remainder portion kept projecting from the loading/ejecting opening of said loader when said loader is pushed, said trigger means including a conversion member arranged on said loader, the conversion member converting the disk insertion operation into a loader pushing operation in cooperation with said loader holder and changing means for changing a beginning time for the loader pushing operation of the conversion member in accordance with a distance of movement of the moving member.

2. An apparatus according to claim 1, wherein the moving member of said detecting means includes a front lever rotatably mounted on said loader and extending in the disk insertion direction, the front lever having a distal end located at the loading/ejecting opening side of said loader, the distal end being movable within the disk insertion plane while being pressed by the outer peripheral edge of the inserted disk as the disk is inserted;

the conversion member of said trigger means includes a rear lever rotatably mounted on said loader and situated on the loading position side of said loader as compared with the front lever with respect to the disk insertion direction, the rear lever having a center of rotation thereof and two ends, one end of the rear lever being movable within the disk insertion plane while being pressed by the outer peripheral edge of the inserted disk; and the changing means of said trigger means includes shift means for shifting the rotational center of the rear lever in a direction intersecting the direction of insertion of the disk, in accordance with a rotational angle of the front lever, and a plurality of stops provided on the loader holder, the stops corresponding to the respective diameters of disks to be inserted into said loader, respectively, and being adapted to prevent the other end of the rear lever from moving, so that the stop corresponding to the inserted disk catches the other end of the rear lever and causes the rear lever to turn around the other end thereof as a fulcrum, thereby pushing in said loader toward the loading position with respect to said loader holder, when the disk is inserted beyond the trigger distance in a manner such that the outer peripheral edge of the inserted disk presses the one end of the rear lever to rotate the rear lever.

3. An apparatus according to claim 2, wherein the shift means includes an arcuate slit formed in the rear end portion of the front lever, a shaft on the rear lever, slidable in the slit and defining the center of rotation of the rear lever, and an aperture formed in said loader and allowing the shaft to shift in a direction intersecting the disk insertion direction.

4. An apparatus according to claim 2, wherein said trigger means further includes trigger action detecting means for detecting the loader pushing operation for said loader and outputting a detection signal, and drive means for moving said loader to the loading position in said loader holder on receiving the detection signal from the trigger action detecting means, the drive means being adapted to return said loader, along with the inserted disk, from the loading position on receiving an ejection signal.

5. An apparatus according to claim 2, wherein the distal end of the front lever and the one end of said rear lever each have a hook adapted to hold the outer peripheral edge of the inserted disk when engaged therewith, such that the center of the inserted disk is situated inside the hook of the front lever when the disk is inserted deeper than the trigger distance.

6. An apparatus according to claim 3, wherein said detecting means further includes another front lever paired with the first front lever, the pair of front levers being arranged on said loader so as to be symmetrical with the respect to the disk insertion direction, and first urging means for urging the pair of front levers to rotate in a direction such that the respective distal ends of the front levers approach each other; and said trigger means further includes another rear lever paired with the first rear lever, the pair of rear levers being arranged on said loader so as to be symmetrical with respect to the disk insertion direction, and second urging means for urging the pair of rear levers to rotate in a direction such that the one end of each rear lever is directed opposite to the disk insertion direction, the pairs of front and rear levers being adapted to center the inserted disk in said loader when the respective hooks thereof hold the inserted disk.

7. An apparatus according to claim 6, wherein each of the front levers has a guided portion between the distal end and rear end portion of the first lever, and said loader holder includes a plurality of guides for guiding the guided portions of the front levers in accordance with the rotational angles of the front levers as said loader moves from the unloading position toward the loading position.

8. An apparatus according to claim 7, wherein said loader holder further includes rests for receiving the guided portions of the pair of front levers when a disk is not inserted in said loader, the rests being adapted to prevent such loader in the unloading position from moving toward the loading position in said loader holder when the guided portions of the front levers are received thereby.

9. An apparatus according to claim 6, wherein the second urging means includes a pair of springs arranged between said loader and the rear levers, such that the respective restoring forces of the springs cause the rear levers corresponding thereto to turn in opposite directions around the other ends thereof when said loader is returned from the loading position and the respective other ends of the rear levers abut individually against the corresponding stops of said loader holder, the respective turns of the rear levers causing the inserted disk to be ejected from said loader into an eject state where the disk is inserted into said loader by the trigger distance.

10. An apparatus according to claim 6, further comprising means for disengaging the respective hooks of the pairs of front and rear levers from the outer peripheral edge of the disk when the loading position is reached by said loader.

* * * * *